United States Patent
Fu et al.

(10) Patent No.: US 12,437,754 B2
(45) Date of Patent: Oct. 7, 2025

(54) MULTIPLE WAKEWORD DETECTION

(71) Applicant: Amazon Technologies, Inc., Seattle, WA (US)

(72) Inventors: Gengshen Fu, Sharon, MA (US); Huitian Lei, Medford, MA (US); Sai Kiran Venkata Subramanya Rupanagudi, Burien, WA (US); Yuriy Mishchenko, Lexington, MA (US); Cody Jacques, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 17/547,547

(22) Filed: Dec. 10, 2021

(65) Prior Publication Data
US 2023/0186902 A1 Jun. 15, 2023

(51) Int. Cl.
*G10L 15/16* (2006.01)
*G10L 15/22* (2006.01)
*G10L 15/08* (2006.01)

(52) U.S. Cl.
CPC ............... *G10L 15/16* (2013.01); *G10L 15/22* (2013.01); *G10L 2015/088* (2013.01); *G10L 2015/223* (2013.01)

(58) Field of Classification Search
CPC ............................... G10L 15/16; G10L 15/22
See application file for complete search history.

(56) References Cited

U.S. PATENT DOCUMENTS

| | | | |
|---|---|---|---|
| 11,295,739 B2* | 4/2022 | Li | G10L 15/22 |
| 11,778,361 B1* | 10/2023 | Lovitt | G06F 3/167 |
| | | | 381/74 |
| 2017/0270919 A1* | 9/2017 | Parthasarathi | G10L 17/06 |
| 2020/0020322 A1* | 1/2020 | Guevara | G06N 3/08 |
| 2020/0125162 A1* | 4/2020 | D'Amato | H04R 29/005 |
| 2020/0184966 A1* | 6/2020 | Yavagal | G10L 15/30 |
| 2020/0258513 A1* | 8/2020 | Smith | G06F 3/167 |
| 2020/0349925 A1* | 11/2020 | Shahid | G10L 15/08 |
| 2021/0090575 A1 | 3/2021 | Mahmood et al. | |

(Continued)

FOREIGN PATENT DOCUMENTS

WO 2016085776 A1 6/2016

OTHER PUBLICATIONS

Ravi, V., Fan, R., Afshan, A., Lu, H., & Alwan, A. (2020). Exploring the use of an unsupervised autoregressive model as a shared encoder for text-dependent speaker verification. arXiv preprint arXiv:2008.03615.*

(Continued)

*Primary Examiner* — Bryan S Blankenagel
(74) *Attorney, Agent, or Firm* — Pierce Atwood LLP

(57) ABSTRACT

A device is configured to detect multiple different wakewords. A device may operate a joint encoder that operates on audio data to determine encoded audio data. The device may operate multiple different decoders which process the encoded audio data to determine if a wakeword is detected. Each decoder may correspond to a different wakeword. The decoders may use fewer computing resources than the joint encoder, allowing for the device to more easily perform multiple wakeword processing. Enabling/disabling wakeword(s) may involve the reconfiguring of a wakeword detector to add/remove data for respective decoder(s).

22 Claims, 16 Drawing Sheets

(56) References Cited

U.S. PATENT DOCUMENTS

| | | | |
|---|---|---|---|
| 2022/0271962 A1* | 8/2022 | Patel | G06F 3/167 |
| 2022/0301550 A1* | 9/2022 | Wei | G10L 25/30 |
| 2022/0406305 A1* | 12/2022 | Salarian | G10L 15/10 |
| 2023/0289132 A1* | 9/2023 | Dureau | H04R 3/005 |

OTHER PUBLICATIONS

International Search Report and Written Opinion mailed Apr. 11, 2023 for International Application No. PCT/US2022/049790, 17 pages.

Invitation to Pay Additional Fees and, Where Applicable, Protest Fee issued Feb. 17, 2023 for International Patent Application No. PCT/US2022/049790.

International Preliminary Report on Patentability mailed Jun. 20, 2024 for International Patent Application No. PCT/US2022/049790.

* cited by examiner

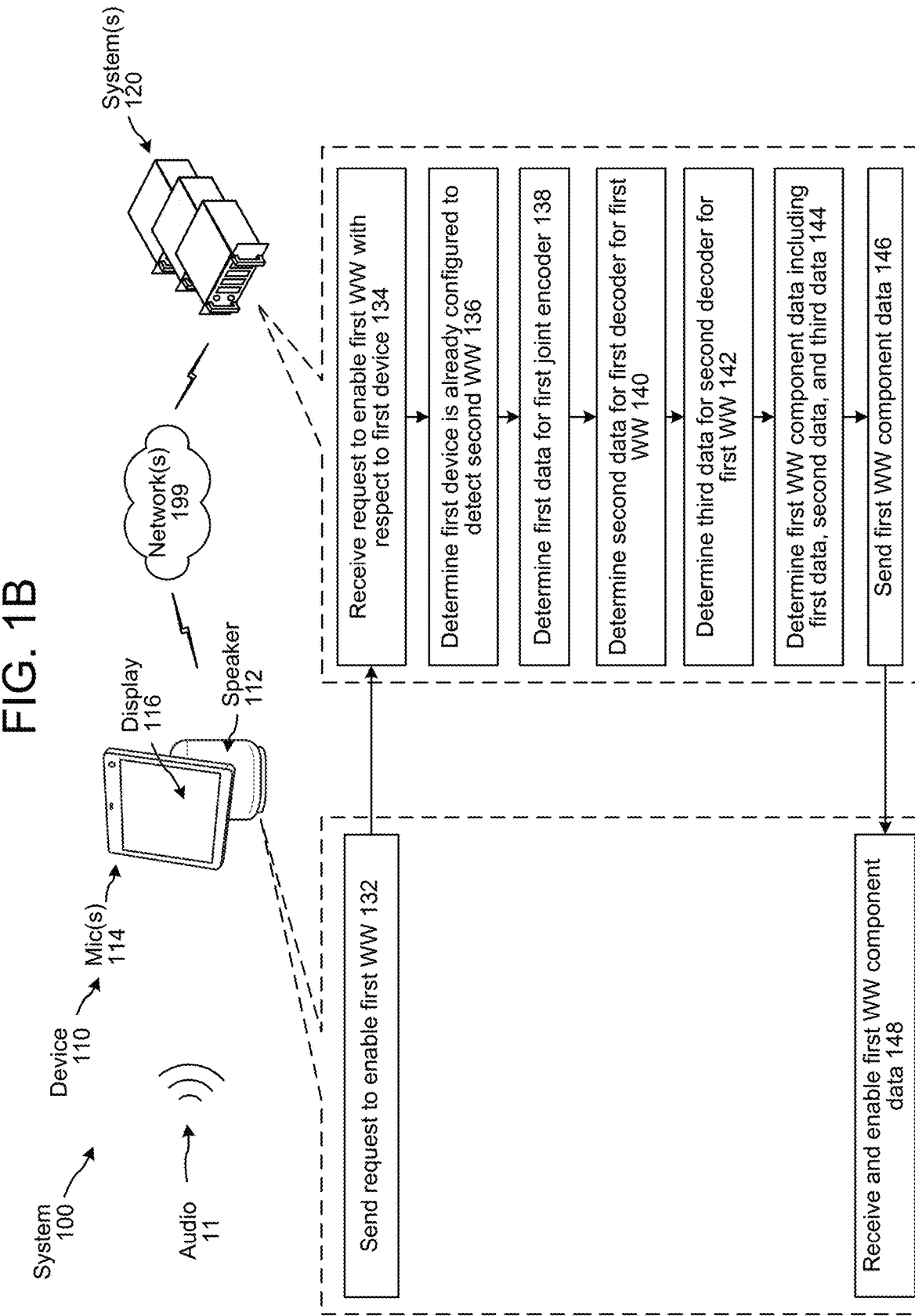

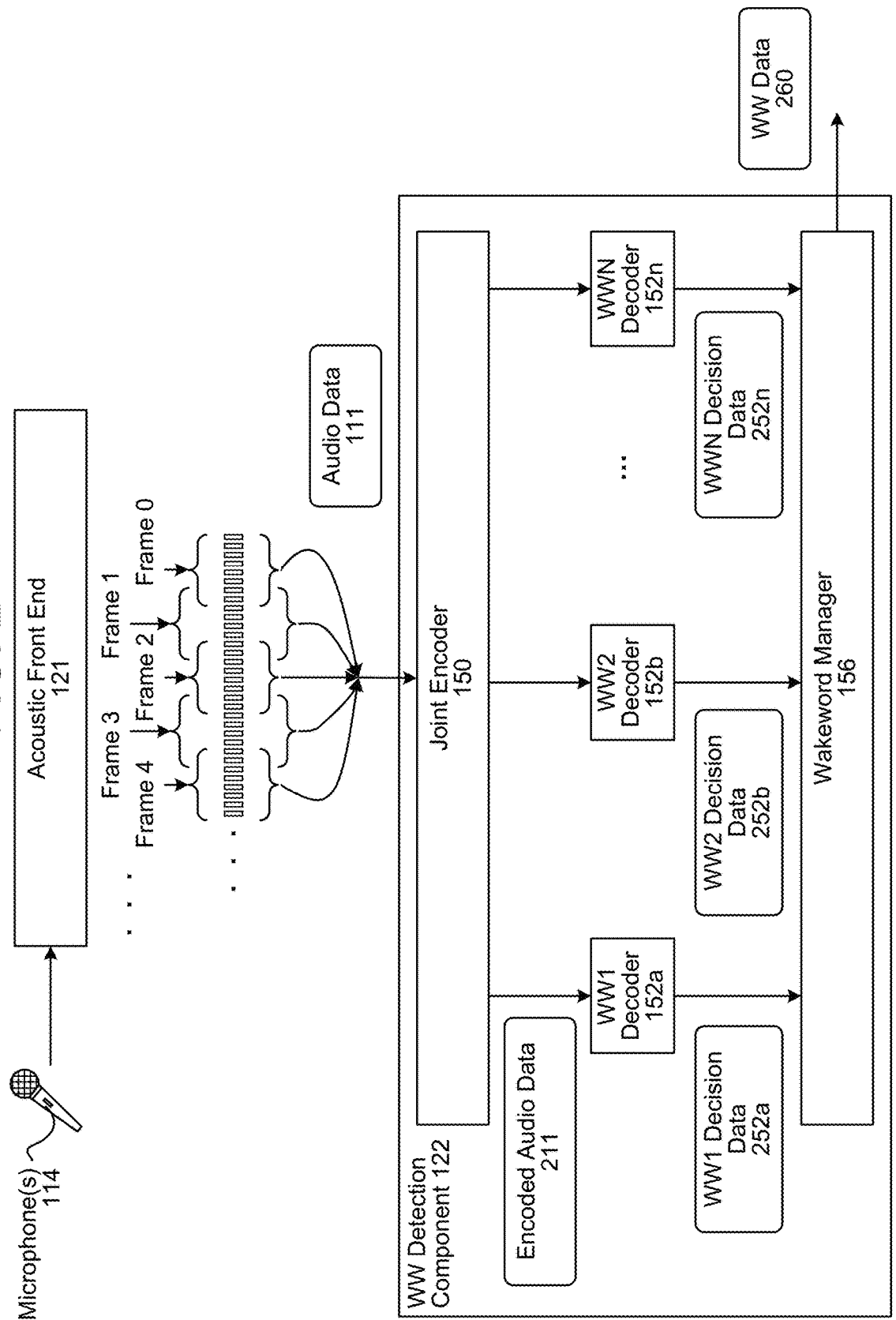

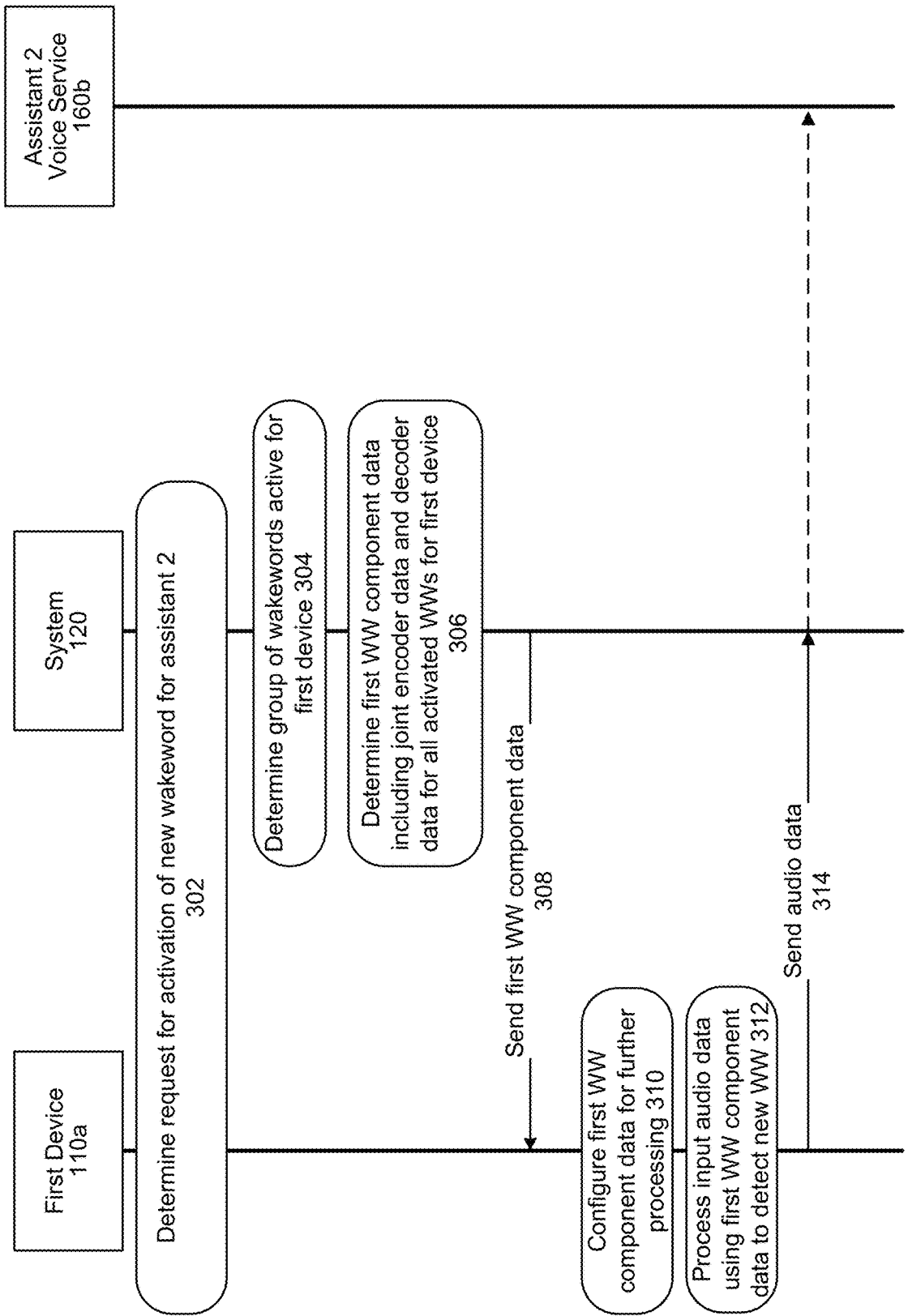

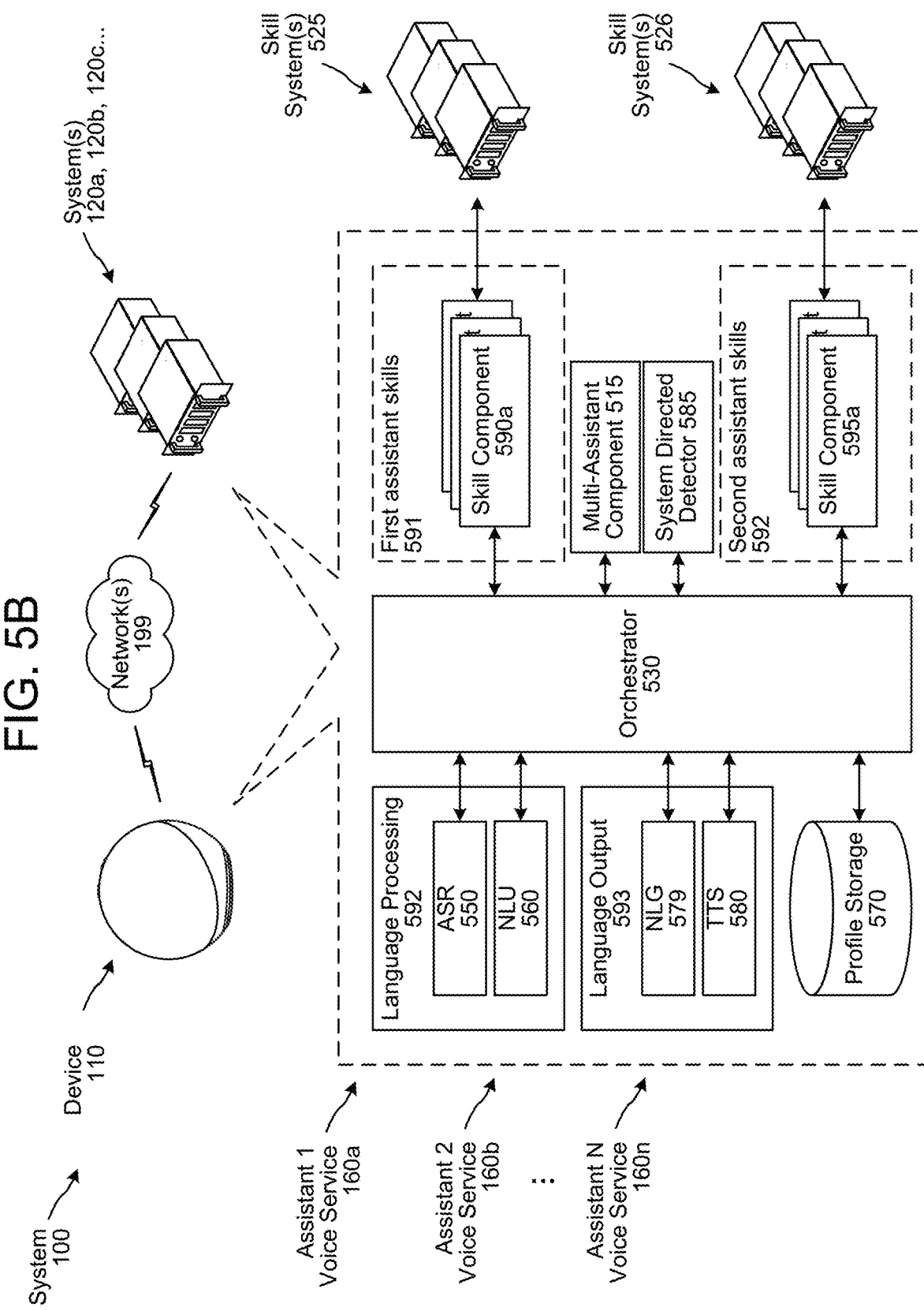

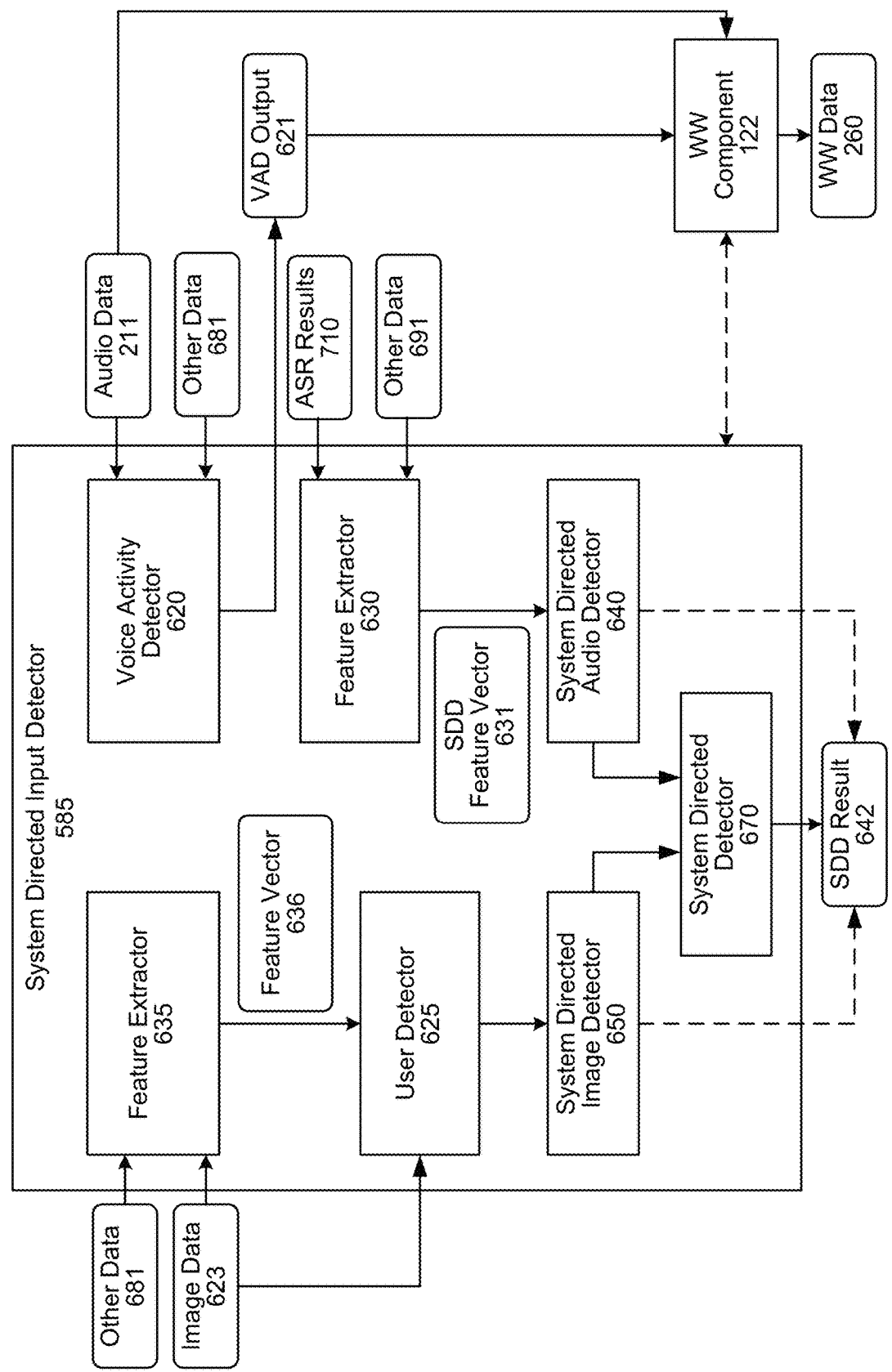

MULTIPLE WAKEWORD DETECTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are conceptual diagrams illustrating components and operations of a multi-assistant system for performing multiple wakeword detection, according to embodiments of the present disclosure.

FIG. 2 is a diagram of a component configured to detect multiple wakewords, according to embodiments of the present disclosure.

FIGS. 3A-3B are signal flow diagrams illustrating configuring a device to determine multiple wakewords, according to embodiments of the present disclosure.

FIG. 5B is a conceptual diagram illustrating components that may be included in a second example implementation of the multi-assistant system, according to embodiments of the present disclosure.

FIG. 6 is a conceptual diagram of components of a system to detect if input audio data includes system directed speech, according to embodiments of the present disclosure.

DETAILED DESCRIPTION

Figure 1A:
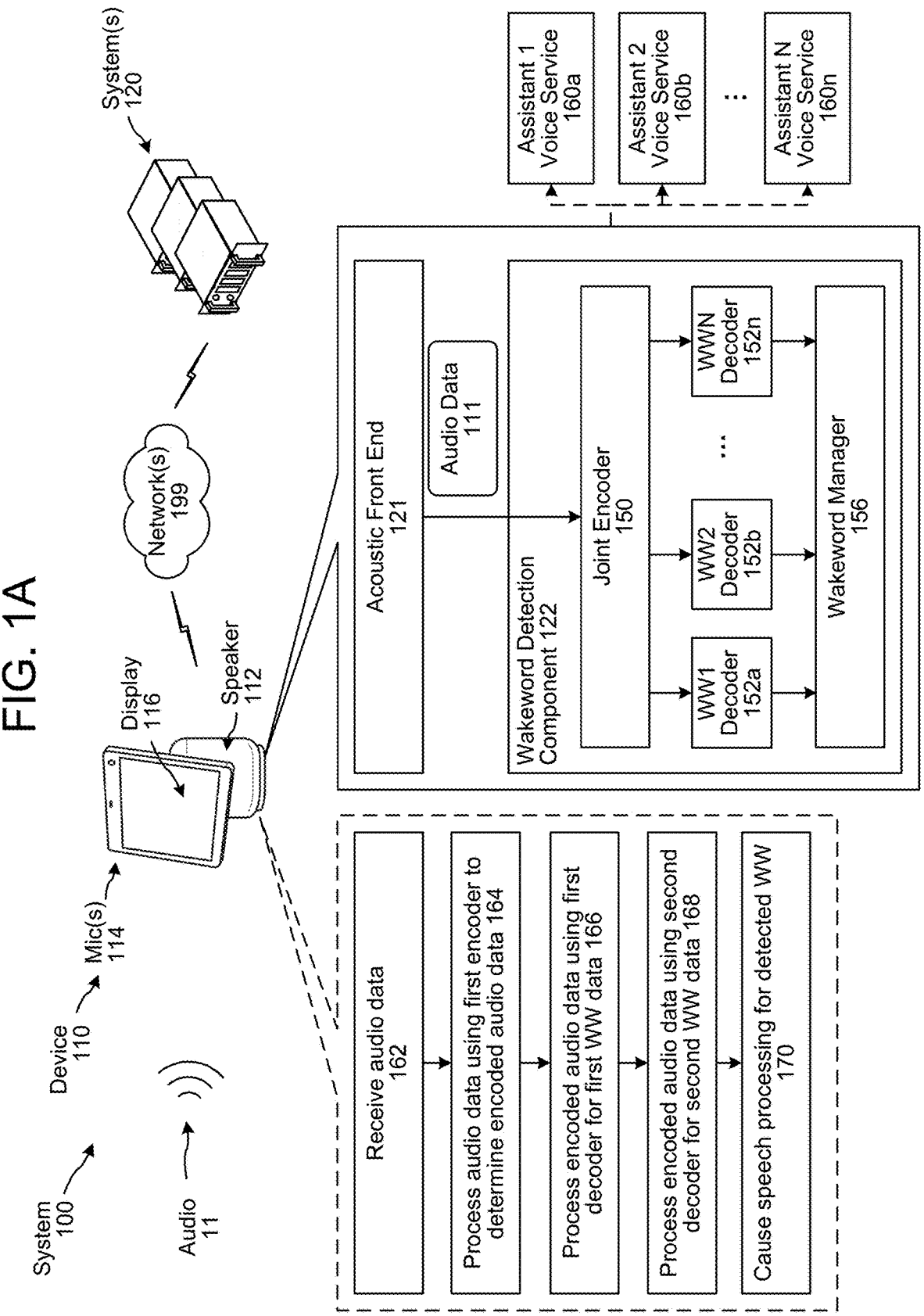

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. Natural language generation (NLG) is a computing process that produces natural language output (for example, text of words) that can be used to select words to interact with a user as part of an exchange between a user and a system. ASR, NLU, TTS, and NLG may be used together as part of a speech-processing system. The virtual assistant can leverage the speech-processing system as well as additional applications and/or skills to perform tasks for and/or on behalf of the user.

To avoid having a device continue to perform processing on detected audio data, and to direct the processing of such audio data, a speech controlled device may be configured to detect a wakeword that may be spoken by a user to spur a system to perform further processing. As used herein, a wakeword includes sounds used to represent a word, less than a word, or more than one word, such as a wake phrase including more than one word, which, when identified by a machine, transitions a device from a first state to a second state for the purpose of performing more processing on the audio data. For example, the second state can involve sending audio data to a speech processing component, or the like, after a user says "Alexa" as a precursor to further speech that the user intends to be processed by a speech processing system. In another example the second state can involve sending a notification to a device (or other action) in response to detecting a particular sound in the audio data.

Some sound-controlled devices can provide access to more than one speech- or other sound-processing system, where each sound-processing system may provide services associated with a different virtual assistant. In such multi-assistant systems, a speech-processing system may be associated with its own wakeword. Upon detecting a representation of a wakeword in an utterance, the device may send audio data representing the utterance to the corresponding speech-processing system. Additionally, or in the alternative, information about which wakeword is spoken may be used to invoke a particular "personality" of the system and be used as context for TTS, NLG, or other components of the system. Thus, to enable access to multi-assistant systems, a device needs to be configured to recognize more than one wakeword. To do so, a device must be configured with wakeword component(s) capable of analyzing incoming speech for each of the wakewords of the corresponding system(s) enabled to process an utterance for the particular device.

For one or two wakewords, this may be technically feasible. But the expanding availability of different systems, each accessible through its own wakeword, makes expanding beyond one or two wakewords becomes technically complex. One reason for this is that wakeword detectors can be computing resource intensive both in terms of computer storage used to store such wakeword detectors and memory/processor usage to operate the wakeword detectors at runtime. If a device is limited in terms of its computing resources, it may be impractical to operate many different wakeword detectors at the same time.

Offered is an improved technical solution to the problem of near-simultaneous wakeword detection. Wakeword detection is split between two layers of components: the first layer is a joint encoder which processes input audio data into feature vectors representing the acoustic units of the input audio data; the second layer is a plurality of decoders—each of which corresponds to a particular wakeword—that can process the feature vectors to determine if the particular wakeword of the decoder is detected. The joint encoder may be trained on thousands of words so that it may be flexible for new wakewords that may be desired in the future. When a user enables recognition of a new wakeword, a new decoder may be enabled for the device and the existing joint encoder may still be used. Each decoder may use significantly fewer computing resources than the joint encoder, allowing a device to add and operate multiple decoders in a near-simultaneous (e.g., simultaneous or partially in parallel so as to reduce latency) manner. Thus a device may be able to recognize many different wakewords at the same time without overwhelming the computing resources of the device.

These and other features of the disclosure are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

In some configurations, a single speech-controlled device can be configured to operate with a single assistant system. For example, an Amazon Echo device would be configured to operate with the Amazon assistant voice service/speech processing system and a Google Home device would be configured to operate with the Google assistant voice service/speech processing system. In some configurations, certain devices can allow a user to select which wakeword the device would recognize (e.g., "Alexa," "Echo," "Computer," etc.), and those wakewords would result only in speech being processed by the same system. In some configurations, devices can be configured to detect multiple wakewords and to send the resulting audio data to a different system depending on the spoken wakeword. For example, the same device would send audio data to an Amazon system if the device detected the wakeword "Alexa" but would send audio data to a Facebook system if the device detected the wakeword "Ok Portal." Similarly, devices may be configured to detect multiple wakewords that may correspond to the same system, but to different "personalities" or skill configurations within that system. For example, a wakeword of "Hey <Celebrity Name>" may send audio data to an Amazon system but the system would respond (for example using NLG and TTS voice) of the particular celebrity. Each such celebrity may correspond to its own assistant NLG and voice service within a particular speech processing system.

A device's wakeword detector may, in some implementations, process input audio data and output a signal when a representation of a wakeword is detected; for example, the wakeword detector may output a logic 0 when no wakeword is detected, transitioning to a logic 1 if/when a wakeword is detected. The wakeword detector may output the wakeword detection signal to client software and/or other components of a system. For example, in some implementations, a wakeword detector may output a wakeword detection signal to an acoustic front end (AFE), in response to which the AFE may begin generating and streaming audio data for processing by the system 100. In some implementations, the wakeword detector may output other metadata upon detecting a wakeword. The other metadata may include a confidence score associated with the detection, fingerprinting (e.g., whether the audio data included a fingerprint signal on the portion representing the wakeword to indicate that the wakeword was output from a media device during, for example, a commercial or other mass media event), and/or other metrics.

The wakeword detector of the device may process the audio data, representing the audio, to determine whether speech is represented therein. The device may use various techniques to determine whether the audio data includes speech. In some examples, the device may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device may implement a classifier configured to distinguish speech from background noise. The classifier may be implemented by techniques such as linear classifiers, support vector machines, and decision trees. In still other examples, the device may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio, is analyzed to determine if specific characteristics of the audio data match preconfigured acoustic waveforms, audio signatures, or other data corresponding to a wakeword.

Thus, the wakeword detection component may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, may also be used.

One technical challenge to the growing availability of multiple wakewords/assistant voice services is that each time a system added a new wakeword, it would also need to add a new wakeword detector that a device would be capable of recognizing. As many devices (particularly legacy devices that have fewer computing resources but still should be enabled to detect new wakewords) are not capable of operating multiple wakeword detectors at once, addition of a new wakeword may involve retraining of a complete wakeword detection model that could take in input audio data and recognize all the available wakewords for the particular device/system, depending on system configuration. (For a particular device that may not be configured to recognize all such wakewords, a component such as a wakeword manager or the like may simply suppress/ignore any detections of wakewords that a user has not enabled, thus preventing a device from waking if it detects an instance of a word that the user has not indicated should be used to wake the device.) As can be appreciated, this becomes technically challenging as wakewords become available, either through the introduction of new speech processing systems, introduction of new assistant voice personalities, introduction of branded or custom voice assistants (for example, one voice assistant for a particular hotel chain, another for a particular theme park, another for a particular store, etc.).

The offered solution of dividing wakeword detection between a joint encoder (which may be used for all wakewords) and individual wakeword-specific decoders allows only a new decoder to be trained each time a new wakeword is offered. The existing joint encoder (and any other existing decoders) could be reused without necessitating a retraining of a complete end-to-end new wakeword detection model that operate in input audio data to detect all the new wakewords.

FIG. 1A is a conceptual diagram illustrating components of a multi-assistant system 100 with default assistant fallback, according to embodiments of the present disclosure. The system 100 may include a device 110, such as the speech controlled device 110 pictured, in communication with one or more remote systems 120 via one or more computer networks 199. The device 110 may include various components for input and output such as one or more displays 116, one or more speakers 112, one or more microphones, 114, etc. In some implementations, the system 100 may detect various gestures (e.g., physical movements) that indicate the system 100 is to receive an input such as audio 11. The system 100 may respond to the user by various means including synthesized speech (e.g., emitted by the speaker 112) conveying a natural language message. Various components of the system 100 as described with reference to FIG. 1A (as well as with reference to FIGS. 5A and 5B) may reside in the device 110, and/or the system 120. In some implementations, various components of the system 100 may be shared, duplicated, and/or divided between, the device 110, other devices 110, and/or the system 120. In certain implementations system 120 may be associated with a cloud service. In other implementations system 120 may be associated with a home server or other device that resides proximate to a user, thus allowing many operations to happen without the user's data being provided to external components. In other implementations operations of system 120 may be split between cloud servers/home servers, and/or other components.

Figure 5A:
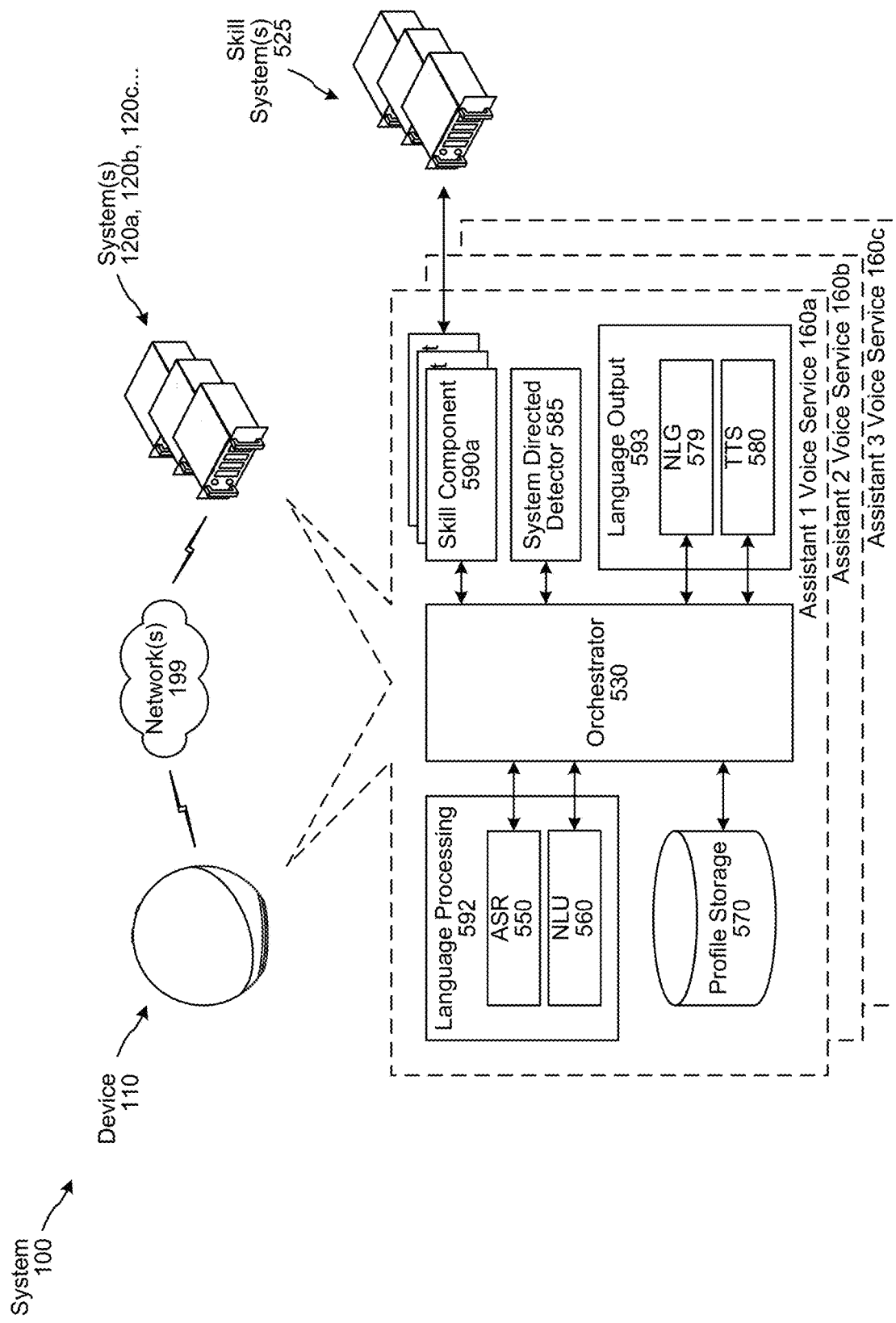
FIG. 5A is a conceptual diagram illustrating components that may be included in a first example implementation of the multi-assistant system, according to embodiments of the present disclosure.

As noted above, the device 110 may provide the user with access to one or more virtual assistants. A virtual assistant may be configured with certain functionalities that it can perform for and/or on behalf of the user. A virtual assistant may further be configured with certain identifying characteristics that may be output to the user to indicate which virtual assistant is receiving input (e.g., listening via the microphone 114), processing (e.g., performing ASR, NLU, and/or executing actions), and/or providing output (e.g., generating output using NLG, speaking via TTS). A user may invoke a particular virtual assistant by, for example, speaking a wakeword associated with that virtual assistant. The system 100 may determine which virtual assistant is to handle the utterance, and process the utterance accordingly; for example, by sending data representing the utterance to the particular speech processing system corresponding to the virtual assistant as illustrated in FIG. 5A and/or processing the utterance using a configuration corresponding to the virtual assistant as illustrated in FIG. 5B.

FIG. 1A illustrates various components of the system 100 that may be configured to make a determination regarding the presence of one or more wakewords in a received utterance. The system 100 may include an acoustic front end (AFE) 121 that may receive the voice data from the microphone 114 and generate audio data 111 for processing by downstream components (e.g., ASR, NLU, etc.). The AFE 121 may also provide a representation of the utterance to one or more wakeword detectors 122. The AFE 121 may include processing to filter the captured speech. For example, the AFE 121 may perform echo cancelation, noise suppression, beamforming, high- and/or low-pass filtering, etc. The AFE 121 may output both raw audio data and audio data processed using one or more of the aforementioned techniques. The AFE 121 may stream the audio data 111 to a voice activity detector (VAD), the wakeword detector(s) 122, or other components.

The wakeword detector 122 can receive (162) the audio data 111 from the AFE 121 and process it to detect the presence of one or more wakewords. The wakeword detector 122 may be a hardware or software component. For example, the wakeword detector 122 may be executable code that may run without external knowledge of other components. As described above, the wakeword detector 122 may have a two layer architecture. First the wakeword detector 122 may include a joint encoder 150 that processes (164) the input audio data to determine encoded audio data, which may include a plurality of feature vectors representing the input audio data. The encoded audio data may then be sent to the plurality of wakeword decoders 152a through 152n depending on how many are enabled for the particular device. Thus the device 110 may process (166) the encoded audio data using a first decoder (e.g., 152a) (which may be associated with a first assistant voice service, e.g., assistant 1 voice service 160*a*) configured to detect a representation of a first wakeword. The device 110 may also process (168) the encoded audio data using a second decoder (e.g., 152*b*) (which may be associated with a second assistant voice service, e.g., assistant 2 voice service 160*b*) configured to detect a representation of a second wakeword. The device 110 may also process the encoded audio data using one or more further decoders associated with different respective wakewords and/or assistant 2 voice service(s) 160.

For illustration purposes, a wakeword may be shown as associated with its own assistant voice service, but multiple wakewords may also be associated with a same assistant voice service. For example, a first decoder 152*a* that detects a first wakeword and second decoder 152*b* that detects a second wakeword may both be associated with the same assistant voice service (e.g., assistant 1 voice service 160*a*) depending on system configuration.

Each decoder may output wakeword decision data to a wakeword manager 156 which may determine, based on the wakeword decision data, if a particular wakeword was represented in the input audio data. While the wakeword manager 156 is illustrated as part of the wakeword detection component 122, it may also be configured as a separate component. The device 110 may then cause (170) speech processing to be performed based on the detected wakeword. For example, by sending audio data 111 (or other data) representing the utterance to the assistant voice service 160 associated with the detected wakeword.

The above system allows fewer computing resources to be used when adding a wakeword to a system 100 generally and when enabling a new wakeword for a particular device 110 specifically. For example, a system 100 may be capable of working with 10 different wakewords, but only a subset those may be enabled for a particular device 110 at any particular point in time. For example a first device 110*a* may be configured to recognize four different wakewords but a second device 110*b* may be configured to recognize three different wakewords, only two of which are enabled for the first device 110*a*. Under one previous system configuration, system 100 may have trained a single wakeword model that is capable of recognizing all 10 wakewords and that model may be distributed to many different devices 110, but each device 110 may only cause an action to be performed in response to detection of one of its respective enabled wakewords and may simply ignore any detections of wakewords that are not enabled for the respective device. Each time the system wishes to add a new possible wakeword, this would enable retraining a large model capable of detect all 11 wakewords at the same time. Such a model may be large and require extensive computing resources by the system 100 to train and deliver to devices and may require extensive computing resources by a device 110 to operate at runtime. Further, this process would need to be repeated each time a new wakeword is enabled by the system (e.g., for wakewords 12, 13, and so forth) to ensure that even legacy devices are capable of detecting new wakewords. Training an individual new wakeword model that can operate on audio data 111 to detect a new wakeword each time may be impractical as it would require a device 110 to run, practically simultaneously, multiple wakeword models on audio data 111. Such operations would be beyond the computing resource capability of many devices 110, making the solution impractical.

By dividing wakeword detection into the joint encoder 150 and the individual wakeword decoders 152, it allows the heaviest computing operations (e.g., converting the audio data 111 into encoded audio data representing acoustic units) to be handled by a single large model (e.g., the joint encoder 150) and the relatively lightweight (in terms of computing resources) detection of wakewords using the encoded audio data to be handled by as many different smaller models (e.g., decoders 152) as needed for the wakewords operable with the system/enabled with respect to the device 110.

To enable detection of a new wakeword by a device 110, the system may simply send a device 110 a new decoder that is associated with the new wakeword the device 110 wishes to enable. Practically speaking, however, this may require the device 110 to have sufficient processing capabilities for the device to incorporate the new decoder 152*x* within its wakeword detection component 122, which may already be configured to operate the joint encoder 150 and other decoders 152*a*-152*n*. This incorporation of a new decoder into an existing wakeword detection component 122 may be more processing than a device 110 (particularly one with limited computing capabilities) is capable of performing. Thus, it may be more efficient for the system 100 to construct wakeword component data that incorporates the joint encoder 150 and all the wakewords the device will be configured to detect (including the new wakeword and the device's previous wakewords)

One example of enabling a new wakeword with respect to a device 110 is shown in FIG. 1B. The operations of FIG. 1B may happen prior to those shown in FIG. 1A (for example to enable one of the wakewords of FIG. 1A) or may happen after those shown in FIG. 1A (for example to enable a new wakeword after the operations of FIG. 1A). As shown in FIG. 1B a device 110 may be capable of operating with a particular set of wakewords. This may include only a single wakeword, multiple wakewords, etc. depending on device configuration. The device 110 may detect a request to enable a new wakeword. As illustrated in FIG. 1B, this is referred to as the first wakeword. This request may correspond to speech from a user, for example "Alexa" turn on "Sam," where "Sam" corresponds to a new wakeword. Alternatively the user may operate an application on a companion device (e.g., smartphone, tablet, etc.) to enable a new wakeword, for example using the Amazon Alexa application on a phone, tablet, etc. to enable a new wakeword as selected, for example, from a menu of available wakewords, voice assistants, etc. The device 110 (or companion device) may send (132) a request to system 120 to enable the first wakeword (WW). The wakeword may be one that is already enabled by the system 120, such that the system 120 has already trained a decoder to detect a representation of the first wakeword using the kind of encoded audio data output by the joint encoder 150.

The system 120 may receive (134) the request to enable the first wakeword with respect to the first device. The system may determine (136) that the device 110 is already configured to detect a number of other wakewords, including a second wakeword. This may include the system 120 reviewing profile data associated with the device 110, one or more users of the device 110, etc. to determine which wakeword(s) are enabled with respect to the device 110. The system 120 may then determine (138) first data of the joint encoder 152, determine (140) second data of the first decoder 152X for the first (e.g., new) wakeword, and determine (142) third data for the second decoder 152*b* for the second (e.g., currently operable) wakeword that the device 110 can already recognize. The system 120 may also determine further data representing decoders for any other wakewords the device is capable of recognizing (or wishes to newly recognize, understanding that this process of adding wakeword capability can happen for a single wakeword at a time or for multiple wakewords at a time). The system 120 can then determine (144) first wakeword component data that includes the first data, second data, third data, and data for any other decoders of wakewords for the device 110. The system 120 can then send (146) the first wakeword component data to the device 110. The device 110 can then receive and enable (148) the first wakeword component data. Enabling the first wakeword component data may involve deleting previous data associated with the device's wakeword detection component 122 and install the first wakeword component data with regard to the device's wakeword detection component 122 so that the wakeword detection component 122 may, going forward, using the first wakeword component data when processing audio data to detect one or more wakewords.

In another embodiment the system 120 may also identify (for example using profile data, or the like) a second device associated with the first device 110. This second device may, for example, be another device in the same home, a device in another location but associated with a same user profile, or the like. The system 120 may then send, to the second device, the same first wakeword component data as was sent to the first device to allow the second device to also detect the new first wakeword. Or the system 120 may construct different wakeword component data that includes the first data for the joint encoder 152, the second data for the decoder of the first wakeword and data for different decoders (such as those enabled for the second device) and may send that different wakeword component data to the second device. In this way a user may indicate that a new wakeword should be detectable for one device and the system may (based on user preferences/permissions, etc.) also enable a second device to detect the new wakeword.

As noted in FIG. 1B, the system 120 may incorporate information about a device's current list of enabled wakewords when determining and sending updated wakeword component data. In one embodiment the system 120 may not necessarily engage in such specific customization and may simply create new wakeword component data including data for the joint encoder 150 and for a larger group of decoders, each corresponding to different wakewords, where that group of wakewords may actually include more wakewords than those a user has specifically selected to be operable with regard to device 110. This may be done for several reasons, including allowing a device 110 to more quickly enable recognition of a new wakeword. For example, if a wakeword detection component 122 is configured with the joint encoder 150 and decoders 152 for ten different wakewords, if a user only wishes to enable two of those wakewords, the wakeword manager 156 may be configured to ignore detections of the eight non-enabled wakewords, which will thus result in no operational change by the device should a non-enabled wakeword be detected. In this situation, if a user later decides to enable a third wakeword, this may simply involve a settings change in the wakeword manager 156, which may be significantly faster than retraining new wakeword component data (for example as shown in FIG. 1B) each time. Thus the new wakeword would be available for use in seconds, rather than making the user wait a longer period of time, which may be undesirable. If a user then wishes to disable the third wakeword, the settings of the wakeword manager 156 may then be changed to ignore any detections of the third wakeword. Which in turn would be less resource intensive than re-installing new wakeword component data that did not include the decoder for the third wakeword. Given that the decoders 152 are significantly smaller than the joint encoder 150, and require fewer computing resources to operate (as explained below) it may result in an improved customer experience to have extra decoders installed on a user device and be ready to go once enabled (e.g., involve a settings change in the wakeword manager 156) than have to retrain a wakeword detection component 122 each time a wakeword is enabled/disabled.

Further operations of wakeword detection are illustrated in FIG. 2. As shown, one or more microphones 114 may capture audio of an utterance. The data from the acoustic front end (AFE) 121 may process the microphone data into processed audio data 111. The audio data 111 may be audio data that has been digitized into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each, 25 ms each, or some other length. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, logarithmic filter-bank energies (LFBEs), neural network feature vector techniques, linear discriminant analysis, semi-tied covariance matrices, or other approaches known to those of skill in the art.

Audio frames may be created in a sliding window approach where one frame overlaps in time with another frame. For example, one 25 ms audio frame may include 5 ms of data that overlap with a previous frame and 5 ms of data that overlap with a next frame. Many such arrangements are possible. This sliding window approach is shown in FIG. 2. The individual audio frames may make up the audio data 111 that is processed by the joint encoder 150. The joint encoder 150 may input a number of the frames at a time and process them to output encoded audio data 211, representing a feature vector of what acoustic units have been detected within that group of frames. For example, the joint encoder may include a trained model that is configured to input 34 frames of audio data, process that audio data, and output encoded audio data 211, which may include a 100-dimensional feature vector representing which acoustic units were detected in those 34 frames. Such acoustic units may include subword units such as phonemes, diaphonemes, tonemes, phones, diphones, triphones, senons, or the like, depending on system configuration. Further, as can be appreciated, the number of frames of input audio data processed at a time by the joint encoder 150, and/or the dimensional size of the feature vector/encoded audio data 211 output by the joint encoder 150 are also configurable.

As the encoded audio data 211 output by the joint encoder 150 may be processed by multiple different decoders 152, including potentially decoders for wakewords that will be enabled by the system 120 long after the joint encoder is trained/deployed, the encoder may be trained on a large vocabulary of words (e.g., 5,000 words) to allow for many different acoustic units to be operable with regard to the encoder, not just those that may correspond to the limited number of wakewords the device 110 may be enabled to recognize at a specific moment in time. As a result the joint encoder 150 may be relatively large and computing resource intensive.

Each individual decoder 152, however, may only be trained to determine whether one word (or a small group of words) is represented in captured audio by processing the encoded audio data 211. Thus, the individual decoders may be relatively small and not as intensive in terms of computing resource usage compared to the joint encoder 150.

As a result, the encoded audio data 211, that resulted from relatively high cost encoder operations, may be sent to multiple decoders for relatively low cost decoding/wakeword detection operations, at only a small increase over the computing resources needed for the encoding, which had to be performed anyway. Thus, adding the ability for a device to detect a new wakeword may be done at a relatively low incremental computing cost.

The tables below show examples of the relative cost operations of the joint encoder 150 versus the decoder(s) 152. For example in one configuration the joint encoder 150 comprises a convolutional neural network (CNN) with the configuration as shown in Table 1:

TABLE 1

| | Input | | | Kernel | | | Striding | | Pooling | | DivM | Multiplications per frame | #weights | Receptive field | | Stride | | Layer type |
|---|---|---|---|---|---|---|---|---|---|---|---|---|---|---|---|---|---|---|
| 1 | 34 | 64 | 1 | 7 | 5 | 96 | 1 | 1 | 2 | 3 | 1 | 201,600.00 | 3,360.00 | 1 | 1 | 1 | 1 | CNN |
| 2 | 14 | 20 | 96 | 5 | 3 | 128 | 3 | 1 | 1 | 2 | 0.16666667 | 552,960.00 | 184,320.00 | 8 | 7 | 2 | 3 | CNN |
| 3 | 4 | 9 | 128 | 2 | 4 | 128 | 1 | 1 | 1 | 1 | 0.16666667 | 131,072.00 | 131,072.00 | 16 | 16 | 6 | 6 | CNN |
| 4 | 3 | 6 | 128 | 2 | 3 | 160 | 1 | 1 | 1 | 1 | 0.16666667 | 81,920.00 | 122,880.00 | 22 | 34 | 6 | 6 | CNN |
| 5 | 2 | 4 | 160 | 2 | 4 | 160 | 1 | 1 | 1 | 1 | 0.16666667 | 34,133.33 | 204,800.00 | 28 | 46 | 6 | 6 | FC |
| 6 | 1 | 1 | 160 | 1 | 1 | 500 | 1 | 1 | 1 | 1 | 0.16666667 | 13,333.33 | 80,000.00 | 34 | 64 | 6 | 6 | FC |
| 7 | 1 | 1 | 500 | 1 | 1 | 100 | 1 | 1 | 1 | 1 | 0.16666667 | 8,333.33 | 50,000.00 | 34 | 64 | 6 | 6 | FC |

As shown, this example of the joint encoder 150 has seven layers, with four CNN layers followed by three fully connected (FC) layers. 34 frames of audio data are input into the first layer and processed as noted by successive layers. A significant number of multiplications per frame may occur in the earlier layers of the joint encoder 150 in order to perform the processing necessary to eventually arrive at the encoded audio data 211. This shows why implementing multiple such encoders may be impossible for devices 110 that have limited available computing resources for such operations.

As can be appreciated, the joint encoder 150 combined with a decoder 152 may be considered as separated layers of an end-to-end operation. Thus, a first layer of a decoder 152 may be considered to be layer eight of a wakeword detection component 122 if the joint encoder 150 has seven layers. This notation is used to illustrate the examples of decoders 152 below. One benefit to the offered solution is that a first decoder 152*a* used to detect a first wakeword need not necessarily have the same construction as second decoder 152*b* used to detect a second wakeword. As different models may work better to detect different wakewords, different models/neural network arrangements may be used for different wakewords. Thus wakeword 1 decoder 152*a* may have a different construction from wakeword 2 decoder 152*b* and so forth. (Certain decoders may also have a similar construction depending on system configuration.)

Thus, in one configuration a decoder 152 (e.g., 152*a*) may be a CNN configured as illustrated in Table 2:

TABLE 2

| | Input | | | Kernel | | | Striding | | Pooling | | DivM | Multiplications per frame | #weights | Receptive field | | Stride | | Layer type |
|---|---|---|---|---|---|---|---|---|---|---|---|---|---|---|---|---|---|---|
| 8 | 4 | 1 | 100 | 4 | 1 | 100 | 1 | 1 | 1 | 1 | 0.16666667 | 6,666.67 | 40,000.00 | 34 | 64 | 6 | 6 | FC |
| 9 | 1 | 1 | 100 | 1 | 1 | 2 | 1 | 1 | 1 | 1 | 0.16666667 | 33.33 | 200.00 | 52 | 64 | 6 | 6 | Linear |
| 11 | 1 | 1 | 2 | | | | | | | | | | | 34 | 64 | 6 | 6 | Output | while another decoder (e.g., 152*b*) may be a convolutional neural network configured as illustrated in Table 3:

TABLE 3

| | Input | | | Kernel | | | Striding | | Pooling | | DivM | Multiplications per frame | #weights | Receptive field | | Stride | | Layer type |
|---|---|---|---|---|---|---|---|---|---|---|---|---|---|---|---|---|---|---|
| 8 | 6 | 1 | 100 | 6 | 1 | 100 | 1 | 1 | 1 | 1 | 0.16666667 | 10,000.00 | 60,000.00 | 34 | 64 | 6 | 6 | FC |
| 9 | 1 | 1 | 100 | 1 | 1 | 2 | 1 | 1 | 1 | 1 | 0.16666667 | 33.33 | 200.00 | 64 | 64 | 6 | 6 | Linear |
| 11 | 1 | 1 | 2 | | | | | | | | | | | 34 | 64 | 6 | 6 | Output | or the other decoder may be a CNN configured as illustrated in Table 4:

TABLE 4

| | Input | | | Kernel | | | Striding | | Pooling | | DivM | Multiplications per frame | #weights | Receptive field | | Stride | | Layer type |
|---|---|---|---|---|---|---|---|---|---|---|---|---|---|---|---|---|---|---|
| 8 | 9 | 1 | 100 | 5 | 1 | 80 | 1 | 1 | 1 | 1 | 0.16666667 | 6,666.67 | 40,000.00 | 34 | 64 | 6 | 6 | CNN |
| 9 | 5 | 1 | 80 | 5 | 1 | 40 | 1 | 1 | 1 | 1 | 0.16666667 | 2,666.67 | 16,000.00 | 58 | 64 | 6 | 6 | FC |
| 10 | 1 | 1 | 40 | 1 | 1 | 2 | 1 | 1 | 1 | 1 | 0.16666667 | 13.33 | 80.00 | 82 | 64 | 6 | 6 | Linear |
| 11 | 1 | 1 | 2 | | | | | | | | | | | 34 | 64 | 6 | 6 | Output | or may be a CNN configured as illustrated in Table 5:

TABLE 5

| | Input | | | Kernel | | | Striding | | Pooling | | DivM | Multiplications per frame | #weights | Receptive field | | Stride | | Layer type |
|---|---|---|---|---|---|---|---|---|---|---|---|---|---|---|---|---|---|---|
| 8 | 12 | 1 | 100 | 6 | 1 | 80 | 1 | 1 | 1 | 1 | 0.16666667 | 8,000.00 | 48,000.00 | 34 | 64 | 6 | 6 | CNN |
| 9 | 7 | 1 | 80 | 7 | 1 | 40 | 1 | 1 | 1 | 1 | 0.16666667 | 3,733.33 | 22,400.00 | 64 | 64 | 6 | 6 | FC |

TABLE 5-continued

| Input | | | | Kernel | | Striding | Pooling | DivM | Multiplications per frame | #weights | Receptive field | | Stride | Layer type |
|---|---|---|---|---|---|---|---|---|---|---|---|---|---|---|
| 10 | 1 | 1 | 40 | 1 | 1 | 2 | 1 | 1 | 1 | 1 | 0.16666667 | 13.33 | 80.00 | 100 | 64 | 6 | 6 | Linear |
| 11 | 1 | 1 | 2 | | | | | | | | | | | 34 | 64 | 6 | 6 | Output |

The decoder 152 need not necessarily be a CNN. It may be a recurrent neural network (RNN) such as a convolutional recurrent neural network (CRNN). For example, it may be an RNN including a long short-term memory (LSTM) layer as illustrated in Table 6:

TABLE 6

| Input | | | | Kernel | | Striding | Pooling | DivM | Multiplications per frame | #weights | Receptive field | | Stride | Layer type |
|---|---|---|---|---|---|---|---|---|---|---|---|---|---|---|
| 8 | 17 | 1 | 100 | 1 | 1 | 100 | 1 | 1 | 1 | 1 | 0.16666667 | 174,583.33 | 80,000.00 | 34 | 64 | 6 | 6 | LSTM |
| 9 | 17 | 1 | 100 | 1 | 1 | 100 | 1 | 1 | 1 | 1 | 0.16666667 | 41,666.67 | 10,000.00 | 34 | 64 | 6 | 6 | FC |
| 10 | 17 | 1 | 100 | 1 | 1 | 2 | 1 | 1 | 1 | 1 | 0.16666667 | 1,250.00 | 300.00 | 34 | 64 | 6 | 6 | Linear |
| 11 | 17 | 1 | 2 | | | | | | | | | | | 34 | 64 | 6 | 6 | Output | or may be an RNN configured as illustrated in Table 7:

TABLE 7

| Input | | | | Kernel | | Striding | Pooling | DivM | Multiplications per frame | #weights | Receptive field | | Stride | Layer type |
|---|---|---|---|---|---|---|---|---|---|---|---|---|---|---|
| 8 | 17 | 1 | 100 | 1 | 1 | 20 | 1 | 1 | 1 | 1 | 0.16666667 | 8,250.00 | 9,600.00 | 34 | 64 | 6 | 6 | LSTM |
| 9 | 17 | 1 | 20 | 1 | 1 | 20 | 1 | 1 | 1 | 1 | 0.16666667 | 1,666.67 | 400.00 | 34 | 64 | 6 | 6 | FC |
| 10 | 17 | 1 | 20 | 1 | 1 | 2 | 1 | 1 | 1 | 1 | 0.16666667 | 250.00 | 60.00 | 34 | 64 | 6 | 6 | Linear |
| 11 | 17 | 1 | 2 | | | | | | | | | | | 34 | 64 | 6 | 6 | Output |

As can be appreciated, many different decoder constructions may be possible. For example a decoder may include a finite state transducer (FST), support vector machine (SVM), residual neural network (resnet), other configuration(s) and/or combinations thereof. Certain decoder constructions may be more well suited to short wakewords (e.g. "Ok") while others may be more well suited to longer wakewords (e.g., "Amelia"). Further, certain decoder constructions may be more well suited for detecting certain combinations of sounds while other decoder constructions may be more well suited for detecting other combinations of sounds. Similarly, the joint encoder 150 may also be of any available configuration, though each decoder may be configured to operate on the data type output by that particular configuration of joint encoder 150. The split encoder/decoder configuration allows the system 120 to configure different types of decoders for different wakewords while only using the single joint encoder configuration. (Different types of joint encoders may also be used, but this may lead to increased system complexity and multiple decoders needed for the same wakeword depending on the different joint encoder configurations, etc. and thus may not be desirable.)

The individual decoders 152 may operate on the encoded audio data 211 to determine if the particular wakeword of the decoder is detected. Thus the decoders may be trained to process the feature vectors of the encoded audio data 211 to detect if the individual acoustic units corresponding to the respective wakeword of that decoder are represented in the encoded audio data 211. Each decoder 152 may output wakeword decision data 252 corresponding to whether the wakeword was detected. The wakeword decision data 252 may include a two-dimensional data vector with one dimension representing a likelihood that the wakeword was detected and the other dimension representing a likelihood that the wakeword was not detected. (In certain configurations, these likelihoods may add to 1, for example with a likelihood score of detection being 0.7 and the likelihood score of non-detection may be 0.3, but this is left to system design.) The wakeword decision data 252 may also include time data indicating, for example, when a wakeword began, how long it lasted, when it ended, etc. which may be used by downstream components. The wakeword decision data 252 may be output on a frame-by-frame basis or on some other basis depending on system configuration/configuration of the particular decoder 152.

The wakeword manager 156 may be configured to receive the wakeword decision data 252 and determine, using that wakeword decision data 252, if a wakeword was detected. For example, if any particular wakeword decision data 252 includes a likelihood/score above a threshold, the wakeword manager 156 may determine that a wakeword was detected. A single threshold may be used or a different threshold may be customized for each decoder 152. Other conditions may also be used by the wakeword manager 156 to determine if a wakeword was detected. For example a likelihood/score below a threshold, within a certain range, multiple likelihoods/scores within a range within a certain period of time, etc. A single condition may be used or a different condition may be customized for each decoder 152. The wakeword manager 156 may output wakeword data 260 which may include an indication that a wakeword was detected (or not), the identifier of the particular wakeword that was detected, time data related to the particular detected wakeword, etc. The device 110 may then process the wakeword data 260 to determine that a particular wakeword was detected and to cause a speech processing component associated with that particular wakeword to perform processing using the audio data 111 or other audio representing the captured audio. The device 110 may also process the wakeword data 260 to determine to perform some other operation, depending on system configuration.

As noted above, one particular wakeword may be associated with a different assistant voice service. Thus, enabling wakewords as discussed herein may allow a device 110 to interact with a different assistant voice service. Processes enabled by the configurations herein allow a device to more easily reach new assistant voice services for speech processing, etc. For example, a first device 110*a*, as shown in FIG. 3A, may already be configured to send audio data to a first assistant voice service 160*a*. The device 110, along with the system 120, may determine (302) a request for activation of a new wakeword for a second assistant voice service 160*b*. The system 120 may then determine (304) a group of wakewords currently active for a first device (for example by reviewing profile data associated with first device 110*a*). This may include a wakeword already detectable by the device 110 to interact with the first assistant voice service 160*a*. The system 120 may determine (306) first wakeword component data including joint encoder data and decoder data for all activated wakewords for the first device, which may now include not only the wakeword associated with the first assistant voice service 160*a* but also the new wakeword associated with the second assistant voice service 160*b*. This first wakeword component data may be considered a "wakeword model" in that the data for the joint encoder may be considered the early layers of the wakeword model and the data for the decoder(s) may be considered the later layers of the wakeword model. The system 120 may send (308) the first wakeword component data to the first device 110 which may then configure (310) the first wakeword component data for further processing, for example by using it to update/reinstall a wakeword detection component 122. The first device 110*a* may then process (312) input audio data using the first wakeword component data (as installed/operating on the first device 110*a*) to detect the new wakeword and then send (314) audio data to the system 120/second assistant voice service 160*b* for processing with regard to the second assistant voice service 160*b* (which may use components of system 120 or may be separate therefrom).

Figure 3B:
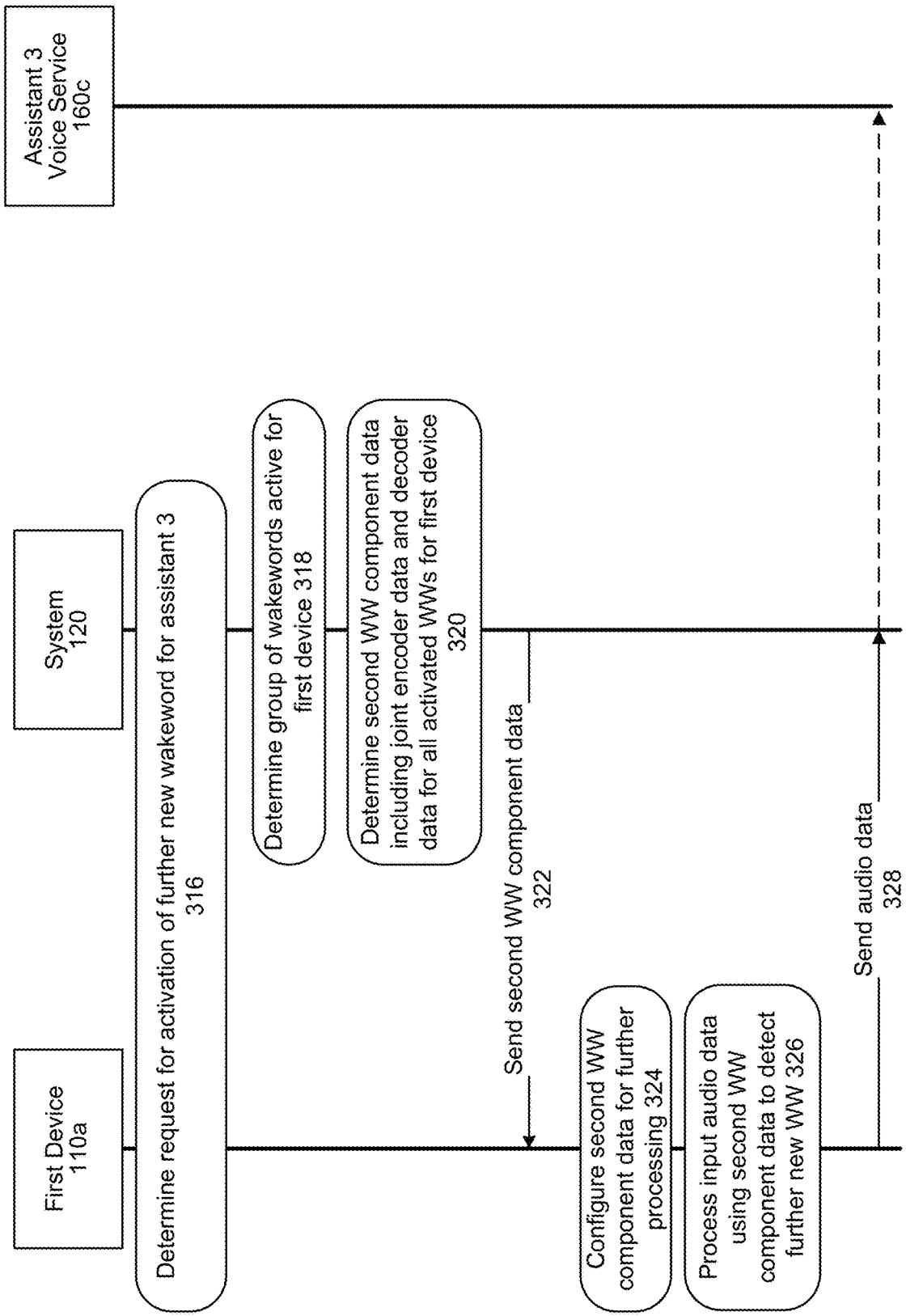

If a user then wishes to enable the first device 110*a* to interact with still another assistant voice service, the process may be easily repeated as shown in FIG. 3B. The device 110, along with the system 120, may determine (316) a request for activation of a further new wakeword, this time for a third assistant voice service 160*c*. The system 120 may then determine (318) a group of wakewords currently active for a first device (for example by reviewing profile data associated with first device 110*a*). This may include a wakeword already detectable by the device 110 to interact with the first assistant voice service 160*a* as well as the new wakeword (added as discussed above with regard to FIG. 3A) for the second assistant voice service 160*b*. The system 120 may determine (320) second wakeword component data including joint encoder data and decoder data for all activated wakewords for the first device, which may now include not only the wakeword associated with the first assistant voice service 160*a* and the second assistant voice service 160*b* but also the further new wakeword associated with the third assistant voice service 160*c*. The system 120 may send (322) the second wakeword component data to the first device 110 which may then configure (324) the second wakeword component data for further processing, for example by using it to update/reinstall a wakeword detection component 122. The first device 110*a* may then process (326) input audio data using the second wakeword component data (as installed/operating on the first device 110*a*) to detect the further new wakeword and then send (328) audio data to the system 120/third assistant voice service 160*c* for processing with regard to the third assistant voice service 160*c* (which may use components of system 120 or may be separate therefrom).

The system may also repeat the operations for FIG. 3A and/or FIG. 3B with a second device 110*b*, which may be associated with a different profile and/or different already-enabled wakewords than the first device 110*a*. Thus the system 120 may configure different wakeword component data for different devices, where the wakeword component data sent to a first device may have data for the same joint encoder but different data for the different decoder(s) depending on which wakewords are enabled for the second device 110*b* relative to the first device 110*a*. In this manner the split configuration of the joint encoder 150 and individual decoders 152 adds further flexibility to the system 120.

In one embodiment the system may, in addition to or in the alternative of creating customized wakeword component data each time a device enables/disables a wakeword, create pre-existing wakeword component data packages ready for deployment upon request. The system may thus create ahead of time, and store for deployment when appropriate, wakeword models (e.g., wakeword component data) corresponding to the top N most popular wakeword combinations. For example, if the top three most popular wakeword (WW) combinations are combination 1: {WW1, WW3, WW5}, combination 2: {WW1, WW2, WW4}, and combination 3: {WW2, WW3, WW5} the system may, even before requested by a device, create three sets of wakeword component data corresponding to each combination. Thus, for combination 1 the system may create wakeword component data 1 (e.g., a wakeword model) including data for the joint encoder as well as data for decoders corresponding to WW1, WW3, and WW5. For combination 2 the system may create wakeword component data 2 (e.g., a wakeword model) including data for the joint encoder as well as data for decoders corresponding to WW1, WW2, and WW4. For combination 3 the system may create wakeword component data 3 (e.g., a wakeword model) including data for the joint encoder as well as data for decoders corresponding to WW2, WW3, and WW5. Then, if device that is configured to detect wakewords 1 and 3 sends a request to enable detection of wakeword 5, the system may simply send that device the previously created and stored wakeword component data 1. While this approach may involve expending computing resources initially in preparing and storing the wakeword component data for the wakeword combinations, doing so may reduce latency experienced at runtime when a device requests a new wakeword to be enabled (or disabled). Rather than needing to configure the wakeword component data in a custom manner for the device, the system may simply send the device the pre-configured wakeword component data, assuming the new combination of wakewords to be enabled for the device is among the combinations for which the system has pre-configured wakeword component data available. Depending on system configuration and available resources, the system may create such pre-configured wakeword component data for many different wakeword combinations, for example the most popular 50, 100, etc. combinations, thus reducing latency for many users when enabling/disabling wakewords.

As can be appreciated, a wakeword may comprise one or more words. For example, "Alexa" may be considered one wakeword while "Ok Google" may be considered a different wakeword. As such, each may have its own decoder 152 associated with it to allow it to be recognized by device 110.

One additional benefit, however, of the present construction, is that it may allow the system 100 to operate using split wakeword configurations more easily. For example, if a user wishes to use (or is required to use) the word "Computer" as a wakeword for a device 110, but also uses the word "computer" in regular conversation, it may be desirable for the user to add a preceding word such as "Ok," "Hey," or the like such that only the combination of words "Ok Computer" results in a wake by the device (e.g., acts like a wakeword for purposes of interactions with the system 100) while a regular mention of "computer" will not. But other users may prefer a combination such as "Hey Computer" or "Wakeup Computer." In another scenario a user may wish to use a single wakeword (e.g., "Alexa") to activate a first assistant voice service and a combination wakeword (e.g., "Hey Sam") to activate a second assistant voice service while a different user of the same device may prefer a different combination of wakewords (e.g., "Hi Alexa" to activate the first assistant voice service and "Wakeup Sam" to activate the second assistant voice service). Previous wakeword detector training and operation did not offer this kind of flexibility due to the difficulties in training as well as the difficulties implementing such operations at runtime.

Figure 4:
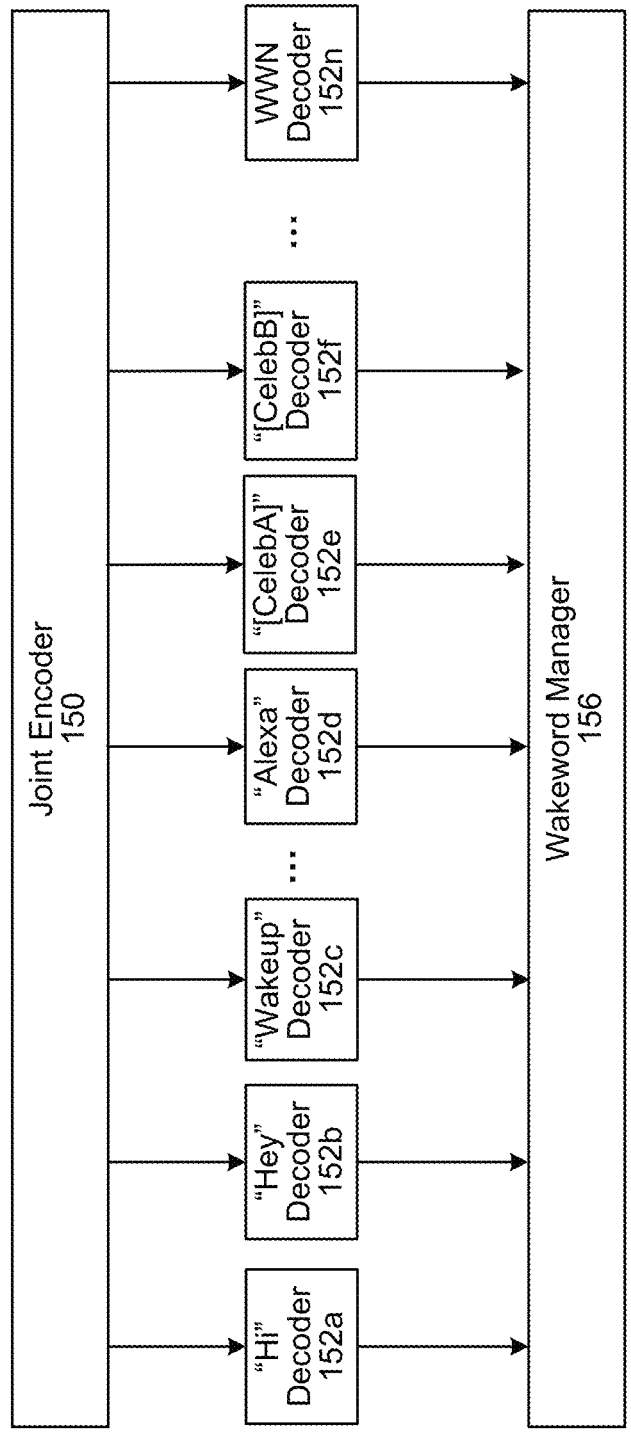
FIG. 4 is a diagram showing multiple wakewords which may be combined to activate a device, according to embodiments of the present disclosure.

The present split configuration of the joint encoder 150 and individual decoders 152, however, may enable such user (or system) configured multiple wakeword detections. In particular, a device 110 may be configured with multiple decoders that are capable not only of detection of what would be considered "primary" wakewords (e.g., "Alexa," "[CelebrityNameA]," "[CelebrityNameB]," etc.) but also preceding words (e.g., "Hey," "Hi," "Wakeup," etc.) or even interim words or words to otherwise assist wakeword detection/assistant voice activation. Such configuration is shown in FIG. 4. As the individual words are detected (by processing encoded audio data 211 with their respective decoders 152), their respective wakeword decision data 252 may be sent to the wakeword manager 156. The wakeword manager 156 may process the wakeword decision data 252, which may include time data for each of the wakewords, to detect if certain words were detected within a certain time of each other, for example, detecting "Hi" right before "Alexa". If the user configures the device 110 to operate using a combination of words in this manner (for example through spoken command with the system 100 and/or through use of a companion application), the settings of the wakeword manager 156 may be updated accordingly. For example, the wakeword manager 156 may operate a state machine to track detections of wakewords, relative time related thereto, etc. Thus, if two wakewords are detected within a certain time of each other, and that combination corresponds to a wake function with regard to a particular assistant voice service, the wakeword manager 156 may indicate in the wakeword data 260 that the particular assistant voice service has been invoked, and the device 110/system may act accordingly, for example by causing speech processing to be performed using the particular assistant voice service. In this manner many different wakeword combinations may be configured and used to wake a device and invoke assistant voice service(s).

The joint encoder/separate decoder configuration may also be used for wakewords that are not necessarily spoken words but can be specific sounds such as a glass breaking, a baby crying, a doorbell, etc. This will allow the described joint encoder/separate decoder configuration to be used for acoustic event detection. Thus the device may be configured with one or more decoders corresponding to a particular acoustic event and may process incoming audio data as described herein to determine if an acoustic event is detected. Detection of such an acoustic event may be represented in wakeword data 260 and may be processed by the device 110 and/or system 120 to perform a variety of actions such as notifying another device associated with the user/user profile of device 110, notifying a different device (such as a device associated with a security monitoring service), or take other actions as indicated, for example, in user settings/a user profile corresponding to the particular acoustic event.

As can be appreciated, an assistant voice service may be used to access many different functions of a virtual assistant. As such, a particular assistant voice service 160 may correspond to language processing components, skill components, language output components, and/or associated components as described in further detail below with reference to FIGS. 5A and 5B. In various implementations, the components represented by the assistant voice services 160 may reside on the device 110 or the system 120, or divided or shared between the two. In some implementations, the assistant 1 voice service 160a may correspond to one or more components of a first system 120a and the assistant 2 voice service 160b may correspond to one or more components of a second system 120b, etc. In some implementations, multiple assistant voice services 160 may correspond to a single system 120, where configuration for each virtual assistant are stored in a multi-assistant component and used to process a user command and/or request using settings and/or resources corresponding to the determined virtual assistant. In other implementations a first assistant voice service 160a may correspond to an entire different system 120a from a second assistant voice service 160b, which may correspond to a system 120b. Thus, in response to detection of a first wakeword associated with the first assistant voice service 160a, the device 110 may send audio data to a speech processing component associated with first system 120a and/or first assistant voice service 160a. But in response to detection of a second wakeword associated with the second assistant voice service 160b, the device 110 may send audio data to a speech processing component associated with second system 120b and/or second assistant voice service 160b.

FIG. 5A is a conceptual diagram illustrating components that may be included in a first example implementation of the multi-assistant system 100, according to embodiments of the present disclosure. In the implementation of the system 100 shown in FIG. 5A, components corresponding to a first virtual assistant (e.g., the assistant 1 voice service 160a) may be divided and/or shared between the device 110 and a first system 120a, components corresponding to a second virtual assistant may be divided and/or shared between the device 110 and a second system 120b, etc. The respective systems 120 may be separate and distinct from each other. Data from the device 110 corresponding to a first virtual assistant (e.g., an utterance to be handled by the first virtual assistant) may be sent to the first system 120a, and data from the device corresponding to a second virtual assistant may be sent to the second system 120b, etc.

The system 100 may operate using various components as described in FIG. 5A. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 122. The wakeword detection component 122 may be configured to detect various wakewords as described herein. In at least some examples, each wakeword may correspond to a name of a different digital assistant. For example, detection of the wakeword "Alexa" by the wakeword detector 122 may result in sending audio data to assistant 1 voice service 160a/system 120a for processing while detection of the wakeword "Computer" by the wakeword detector may result in sending audio data to assistant 2 voice service 160b/system 120b for processing. The system may have a separate wakeword and system for different skills/systems (e.g., "Dungeon Master" for a game play assistant 3 voice service 160c/system 120c) and/or such skills/systems may be coordinated by one or more skill(s) 590 of one or more systems 120. In another example, input to the system may be in form of text data 513, for example as a result of a user typing an input into a user interface of device 110. Other input forms may include indication that the user has pressed a physical or virtual button on device 110, the user has made a gesture, etc.

For example, the device 110/system 120 may use a system directed detector 585 to determine if a user input is directed at the system. The system directed input detector 585 may be configured to determine whether an input to the system (for example speech, a gesture, etc.) is directed to the system or not directed to the system (for example directed to another user, etc.). The system directed input detector 585 may work in conjunction with the wakeword detector 122. If the system directed input detector 585 determines an input is directed to the system, the device 110 may "wake" and begin sending captured data for further processing (for example, processing audio data using the language processing 592, processing captured image data using an image processing component or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible. Further details regarding the system directed input detector 585 are included below with regard to FIG. 6.

Following detection of a wakeword, button press, or other indication to begin receiving input, the device 110 may "wake" and begin generating and processing audio data 111 representing the audio 11. The audio data 111 may include data corresponding to the wakeword; in other embodiments, the portion of the audio corresponding to the wakeword may be removed prior to downstream processing of the audio data 111 (e.g., ASR and/or NLU). In the case of touch input detection or gesture based input detection, the audio data may not include a wakeword.

Upon receipt by the system 100, the audio data 111 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 111 to a language processing component 592. The language processing component 592 (sometimes also referred to as a spoken language understanding (SLU) component) includes an automatic speech recognition (ASR) component 550 and a natural language understanding (NLU) component 560. The ASR component 550 may transcribe the audio data 111 into text data. The ASR component 550 may receive the audio data 111 in a streaming fashion; that is, the ASR component 550 may begin receiving and/or processing the audio data 111 as it is generated by the system 100 and without necessarily waiting for the user to stop speaking, release a button, or otherwise indicate an end of speech. The text data output by the ASR component 550 represents one or more than one (e.g., in the form of an N-best list) ASR hypotheses representing speech represented in the audio data 111. The ASR component 550 interprets the speech in the audio data 111 based on a similarity between the audio data 111 and pre-established language models. For example, the ASR component 550 may compare the audio data 111 with models for sounds (e.g., acoustic units such as phonemes, triphones, senons, phones, etc.) and sequences of sounds to identify words that match the sequence of sounds of the speech represented in the audio data 111. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein. The ASR component 550 is described in greater detail below with regard to FIG. 7.

The speech processing system 592 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the device 110, the system(s) 120, a skill component 590, a skill system(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the device 110. In another example, if the text data corresponds to "turn off the lights," the NLU component 560 may determine an intent that the system turn off lights associated with the device 110 or the user 5. However, if the NLU component 560 is unable to resolve the entity—for example, because the entity is referred to by anaphora such as "this song" or "my next appointment"—the speech processing system 592 can send a decode request to another speech processing system 592 for information regarding the entity mention and/or other context related to the utterance. The speech processing system 592 may augment, correct, or base results data upon the audio data 111 as well as any data received from the other speech processing system 592.

The NLU component 560 may return NLU results data 985/925 (which may include tagged text data, indicators of intent, etc.) back to the orchestrator 530. The orchestrator 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data 985/925 includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 565 which may incorporate other information to rank potential interpretations determined by the NLU component 560. The NLU component 560, post-NLU ranker 565 and other components are described in greater detail below with regard to FIGS. 8 and 9.

A skill component may be software running on the system(s) 120 that is akin to a software application. That is, a skill component 590 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 590. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 590 may operate in conjunction between the system(s) 120 and other devices, such as the device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill support system(s) 525 may communicate with a skill component(s) 590 within the system(s) 120 and/or directly with the orchestrator component 530 or with other components. A skill support system(s) 525 may be configured to perform one or more actions. An ability to perform such action(s) may sometimes be referred to as a "skill." That is, a skill may enable a skill support system(s) 525 to execute specific functionality in order to provide data or perform some other action requested by a user. For example, a weather service skill may enable a skill support system(s) 525 to provide weather information to the system(s) 120, a car service skill may enable a skill support system(s) 525 to book a trip with respect to a taxi or ride sharing service, an order pizza skill may enable a skill support system(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 590 dedicated to interacting with the skill support system(s) 525. Unless expressly stated otherwise, reference to a skill, skill device, or skill component may include a skill component 590 operated by the system(s) 120 and/or skill operated by the skill support system(s) 525. Moreover, the functionality described herein as a skill or skill may be referred to using many different terms, such as an action, bot, app, or the like. The skill 590 and or skill support system(s) 525 may return output data to the orchestrator 530.

The system 120 includes a language output component 593. The language output component 593 includes a natural language generation (NLG) component 579 and a text-to-speech (TTS) component 580. The NLG component 579 can generate text for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580 (e.g., output text data 1010 discussed below). Alternatively or in addition, the TTS component 580 may receive text data from a skill 590 or other system component for output.

The NLG component 579 may include a trained model. The NLG component 579 generates text data 1010 from dialog data received (e.g., by a dialog manager) such that the output text data 1010 has a natural feel and, in some embodiments, includes words and/or phrases specifically formatted for a requesting individual. The NLG may use templates to formulate responses. And/or the NLG system may include models trained from the various templates for forming the output text data 1010. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 580.

The TTS component 580 may generate audio data (e.g., synthesized speech) from text data using one or more different methods. Text data input to the TTS component 580 may come from a skill component 590, the orchestrator component 530, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 5B is a conceptual diagram illustrating components that may be included in a second example implementation of the multi-assistant system 100, according to embodiments of the present disclosure. In the implementation of the system 100 shown in FIG. 5B, components corresponding to multiple virtual assistants may be incorporated as part of a same system 120. For example, a system may allow access to different celebrity personality assistants (e.g., assistant 1 voice service 160a, assistant 2 voice service 160b, etc.) within the same system 120. Various operations of the voice assistants may be divided and/or shared between the device 110 and the system 120. Processing of data by components of the system 120 may be performed according to a determined virtual assistant using configuration data maintained by the multi-assistant component 515. For example, data received by the system 120 for processing may include an assistant identifier or other metadata that the components of the system 120 may use to process the data in a manner consistent with the determined virtual assistant. Thus, the system 120 may perform language processing using models, entity libraries, etc. corresponding to the determined virtual assistant, and may generate synthesized speech using voice parameters corresponding to the determined virtual assistant, etc. As can be appreciated, configurations of FIGS. 5A and 5B may be used together, for example with certain assistant voice services being part of a same system and certain assistant voice services being part of separate respective systems.

In some implementations, the system 120 may have and/or interface with skill components dedicated to a particular virtual assistant. For example, the device 110 and/or system 120 may include first assistant skills 591, which may include skill components 590 as previously described. The device 110 and/or system 120 may further include second assistant skills 592 including skill components 595a, 595b, and 595c (collectively, "skill components 592"). In some implementations, the skill components 592 may be the same as or similar to the skill components 590. In some implementations, the first assistant skills 591 may provide different functionality than the second assistant skills. In some implementations, the first assistant skills 591 may be general-purpose skills (e.g., shopping, weather, music, etc.) not specific to a particular domain or device, while the second assistant skills 592 may be specialized to a certain domain, device, service, etc., such as for controlling operations of the smart TV 110g. Some of the skill components 590 may interface with one or more skill support systems 525; similarly, some of the skill components 592 may interface with one or more skill support systems 526. In some implementations, the system 100 may have other skills and/or skill components that are common to more than one virtual assistant.

Other components of the system 100 illustrated in FIG. 5B, such as the language processing components 592, language output components 593, profile storage 570, and/or orchestrator component 530 may be the same as or similar to the corresponding components as described with respect to FIG. 5A.

Configuration and operation of the system directed input detector 585 is illustrated in FIG. 6. As shown in FIG. 6, the system directed input detector 585 may include a number of different components. First, the system directed input detector 585 may include a voice activity detector (VAD) 620. The VAD 620 may operate to detect whether the incoming audio data 111 includes speech or not. The VAD output 621 may be a binary indicator. Thus, if the incoming audio data 111 includes speech, the VAD 620 may output an indicator 621 that the audio data 111 does includes speech (e.g., a 1) and if the incoming audio data 111 does not includes speech, the VAD 620 may output an indicator 621 that the audio data 111 does not includes speech (e.g., a 0). The VAD output 621 may also be a score (e.g., a number between 0 and 1) corresponding to a likelihood that the audio data 111 includes speech. The VAD 620 may also perform start-point detection as well as end-point detection where the VAD 620 determines when speech starts in the audio data 111 and when it ends in the audio data 111. Thus the VAD output 621 may also include indicators of a speech start point and/or a speech endpoint for use by other components of the system. (For example, the start-point and end-points may demarcate the audio data 111 that is sent to the speech processing component 240.) The VAD output 621 may be associated with a same unique ID as the audio data 111 for purposes of tracking system processing across various components.

The VAD 620 may operate using a variety of VAD techniques, including those described above with regard to VAD operations performed by device 110. The VAD may be configured to be robust to background noise so as to accurately detect when audio data actually includes speech or not. The VAD 620 may operate on raw audio data 111 such as that sent by device 110 or may operate on feature vectors or other data representing the audio data 111. For example, the VAD 620 may take the form of a deep neural network (DNN) and may operate on a single feature vector representing the entirety of audio data 111 received from the device or may operate on multiple feature vectors, for example feature vectors representing frames of audio data where each frame covers a certain amount of time of audio data (e.g., 25 ms). The VAD 620 may also operate on other data 681 that may be useful in detecting voice activity in the audio data 111. For example, the other data 681 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 111 to determine if that voice matches a voice in the reference section of speech. If the voices match, that may be an indicator to the VAD 620 that speech was detected. If not, that may be an indicator to the VAD 620 that speech was not detected. (For example, a representation may be taken of voice data in the first input audio data which may then be compared to the second input audio data to see if the voices match. If they do (or do not) that information may be considered by the VAD 620.) The VAD 620 may also consider other data when determining if speech was detected. The VAD 620 may also consider speaker ID information (such as may be output by a user recognition component), directionality data that may indicate what direction (relative to the capture device 110) the incoming audio was received from. Such directionality data may be received from the device 110 and may have been determined by a beamformer or other component of device 110. The VAD 620 may also consider data regarding a previous utterance which may indicate whether the further audio data received by the system is likely to include speech. Other VAD techniques may also be used.

If the VAD output 621 indicates that no speech was detected the system (through orchestrator 530 or some other component) may discontinue processing with regard to the audio data 111, thus saving computing resources that might otherwise have been spent on other processes (e.g., ASR for the audio data 111, etc.). If the VAD output 621 indicates that speech was detected, the system may make a determination as to whether the speech was or was not directed to the speech-processing system. Such a determination may be made by the system directed audio detector 640. The system directed audio detector 640 may include a trained model, such as a DNN, that operates on a feature vector which represent certain data that may be useful in determining whether or not speech is directed to the system. To create the feature vector operable by the system directed audio detector 640, a feature extractor 630 may be used. The feature extractor 630 may input ASR results 710 which include results from the processing of the audio data 111 by the speech recognition component 550. For privacy protection purposes, in certain configurations the ASR results 710 may be obtained from a language processing component 592/ASR component 550 located on device 110 or on a home remote component as opposed to a language processing component 592/ASR component 550 located on a cloud or other remote system 120 so that audio data 111 is not sent remote from the user's home unless the system directed input detector component 585 has determined that the input is system directed. Though this may be adjusted depending on user preferences/system configuration.

The ASR results 710 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 710 may include a trellis, which may include a raw search graph as scored during ASR decoding. The ASR results 710 may also include a lattice, which may be a trellis as scored that has been pruned to remove certain hypotheses that do not exceed a score threshold or number of hypotheses threshold. The ASR results 710 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 710 may also include corresponding respective scores (such as for a trellis, lattice, confusion network, individual hypothesis, N-best list, etc.)

The ASR results 710 (or other data 691) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 550 being less confident about its best hypothesis, which in turn may correlate to detected speech not being device directed. The entropy may be a feature included in other data 691 to be considered by the system directed audio detector 640.

The system may also determine and consider ASR decoding costs, which may include features from Viterbi decoding costs of the ASR. Such features may indicate how well the input acoustics and vocabulary match with the acoustic models 753 and language models 754. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 550 is less confident about the top hypothesis, which may correlate to detected speech not being device directed. Other such features or data from the ASR results 710 may also be used as other data 691.

The ASR results 710 may be represented in a system directed detector (SDD) feature vector 631 that can be used to determine whether speech was system-directed. The feature vector 631 may represent the ASR results 710 but may also represent audio data 111 (which may be input to feature extractor 630) or other information. Such ASR results may be helpful in determining if speech was system-directed. For example, if ASR results include a high scoring single hypothesis, that may indicate that the speech represented in the audio data 111 is directed at, and intended for, the device 110. If, however, ASR results do not include a single high scoring hypothesis, but rather many lower scoring hypotheses, that may indicate some confusion on the part of the speech recognition component 550 and may also indicate that the speech represented in the audio data 111 was not directed at, nor intended for, the device 110.

The ASR results 710 may include complete ASR results, for example ASR results corresponding to all speech between a startpoint and endpoint (such as a complete lattice, etc.). In this configuration the system may wait until all ASR processing for a certain input audio has been completed before operating the feature extractor 630 and system directed audio detector 640. Thus the system directed audio detector 640 may receive a feature vector 631 that includes all the representations of the audio data 111 created by the feature extractor 630. The system directed audio detector 640 may then operate a trained model (such as a DNN) on the feature vector 631 to determine a score corresponding to a likelihood that the audio data 111 includes a representation of system-directed speech. If the score is above a threshold, the system directed audio detector 640 may determine that the audio data 111 does include a representation of system-directed speech. The SDD result 642 may include an indicator of whether the audio data includes system-directed speech, a score, and/or some other data.

The ASR results 710 may also include incomplete ASR results, for example ASR results corresponding to only some speech between a between a startpoint and endpoint (such as an incomplete lattice, etc.). In this configuration the feature extractor 630/system directed audio detector 640 may be configured to operate on incomplete ASR results 710 and thus the system directed audio detector 640 may be configured to output an SSD result 642 that provides an indication as to whether the portion of audio data processed (that corresponds to the incomplete ASR results) corresponds to system directed speech. The system may thus be configured to perform ASR at least partially in parallel with the system directed audio detector 640 to process ASR result data as it is ready and thus continually update an SDD result 642. Once the system directed input detector 585 has processed enough ASR results and/or the SDD result 642 exceeds a threshold, the system may determine that the audio data 111 includes system-directed speech. Similarly, once the system directed input detector 585 has processed enough ASR results and/or the SDD result 642 drops below another threshold, the system may determine that the audio data 111 does not include system-directed speech.

The SDD result 642 may be associated with a same unique ID as the audio data 111 and VAD output 621 for purposes of tracking system processing across various components.

The feature extractor 630 may also incorporate in a feature vector 631 representations of other data 691. Other data 691 may include, for example, word embeddings from words output by the speech recognition component 550 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 630 processing and representing a word embedding in a feature vector 631 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 691 may also include, for example, NLU output from the natural language 560 component may be considered. Thus, if natural language output data 985/925 indicates a high correlation between the audio data 111 and an out-of-domain indication (e.g., no intent classifier scores from ICs 864 or overall domain scores from recognizers 863 reach a certain confidence threshold), this may indicate that the audio data 111 does not include system-directed speech. Other data 691 may also include, for example, an indicator of a user/speaker as output by a user recognition component (not shown). Thus, for example, if the user recognition component does not indicate the presence of a known user, or indicates the presence of a user associated with audio data 111 that was not associated with a previous utterance, this may indicate that the audio data 111 does not include system-directed speech. The other data 691 may also include an indication that a voice represented in audio data 111 is the same (or different) as the voice detected in previous input audio data corresponding to a previous utterance. The other data 691 may also include directionality data, for example using beamforming or other audio processing techniques to determine a direction/location of a source of detected speech and whether that source direction/location matches a speaking user. The other data 691 may also include data indicating that a direction of a user's speech is toward a device 110 or away from a device 110, which may indicate whether the speech was system directed or not.

Other data 691 may also include image data 623. For example, if image data is detected from one or more devices that are nearby to the device 110 (which may include the device 110 itself) that captured the audio data being processed using the system directed input detector (585), the image data may be processed to determine whether a user is facing an audio capture device for purposes of determining whether speech is system-directed as further explained below.

Other data 691 may also dialog history data. For example, the other data 691 may include information about whether a speaker has changed from a previous utterance to the current audio data 111, whether a topic of conversation has changed from a previous utterance to the current audio data, how NLU results from a previous utterance compare to NLU results obtained using the current audio data 111, other system context information. The other data 691 may also include an indicator as to whether the audio data 111 was received as a result of a wake command or whether the audio data 111 was sent without the device 110 detecting a wake command (e.g., the device 110 being instructed by remote system 120 and/or determining to send the audio data without first detecting a wake command).

Other data 691 may also include information from the user profile 570.

Other data 691 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 691 may also include acoustic feature data such as pitch, prosody, intonation, volume, or other data descriptive of the speech in the audio data 111. As a user may use a different vocal tone to speak with a machine than with another human, acoustic feature information may be useful in determining if speech is device-directed.

Other data 691 may also include an indicator that indicates whether the audio data 111 includes a wakeword. For example, if a device 110 detects a wakeword prior to sending the audio data 111 to the remote system 120, the device 110 may send along an indicator that the device 110 detected a wakeword in the audio data 111. In another example, the remote system 120 may include another component that processes incoming audio data 111 to determine if it includes a wakeword. If it does, the component may create an indicator indicating that the audio data 111 includes a wakeword. The indicator may then be included in other data 691 to be incorporated in the feature vector 631 and/or otherwise considered by the system directed audio detector 640.

Other data 691 may also include device history data such as information about previous operations related to the device 110 that sent the audio data 111. For example, the other data 691 may include information about a previous utterance that was just executed, where the utterance originated with the same device 110 as a current utterance and the previous utterance was within a certain time window of the current utterance. Device history data may be stored in a manner associated with the device identifier (which may also be included in other data 691), which may also be used to track other information about the device, such as device hardware, capability, location, etc.

The other data 681 used by the VAD 620 may include similar data and/or different data from the other data 691 used by the feature extractor 630. The other data 681/691 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 640 and/or the VAD 620) may be based on the data from the previous utterance. For example, a score threshold (for the system directed audio detector 640 and/or the VAD 620) may be based on acoustic data from a previous utterance.

The feature extractor 630 may output a single feature vector 631 for one utterance/instance of input audio data 611. The feature vector 631 may consistently be a fixed length, or may be a variable length vector depending on the relevant data available for particular audio data 111. Thus, the system directed audio detector 640 may output a single SDD result 642 per utterance/instance of input audio data 611. The SDD result 642 may be a binary indicator. Thus, if the incoming audio data 111 includes system-directed speech, the system directed audio detector 640 may output an indicator 642 that the audio data 111 does includes system-directed speech (e.g., a 1) and if the incoming audio data 111 does not includes system-directed speech, the system directed audio detector 640 may output an indicator 642 that the audio data 111 does not system-directed includes speech (e.g., a 0). The SDD result 642 may also be a score (e.g., a number between 0 and 1) corresponding to a likelihood that the audio data 111 includes system-directed speech. Although not illustrated in FIG. 6, the flow of data to and from the system directed input detector 585 may be managed by the orchestrator 530 or by one or more other components.

The trained model(s) of the system directed audio detector 640 may be trained on many different examples of SDD feature vectors that include both positive and negative training samples (e.g., samples that both represent system-directed speech and non-system directed speech) so that the DNN and/or other trained model of the system directed audio detector 640 may be capable of robustly detecting when speech is system-directed versus when speech is not system-directed.

A further input to the system directed input detector 585 may include output data from TTS component 580 to avoid synthesized speech output by the system being confused as system-directed speech spoken by a user. The output from the TTS component 580 may allow the system to ignore synthesized speech in its considerations of whether speech was system directed. The output from the TTS component 580 may also allow the system to determine whether a user captured utterance is responsive to the TTS output, thus improving system operation.

The system directed input detector 585 may also use echo return loss enhancement (ERLE) and/or acoustic echo cancellation (AEC) data to avoid processing of audio data generated by the system.

As shown in FIG. 6, the system directed input detector 585 may simply user audio data to determine whether an input is system directed (for example, system directed audio detector 640 may output an SDD result 642). This may be true particularly when no image data is available (for example for a device without a camera). If image data 623 is available, however, the system may also be configured to use image data 623 to determine if an input is system directed. The image data 623 may include image data captured by device 110 and/or image data captured by other device(s) in the environment of device 110. The audio data 111, image data 623 and other data 681 may be timestamped or otherwise correlated so that the system directed input detector 585 may determine that the data being analyzed all relates to a same time window so as to ensure alignment of data considered with regard to whether a particular input is system directed. For example, the system directed input detector 585 may determine system directedness scores for every frame of audio data/every image of a video stream and may align and/or window them to determine a single overall score for a particular input that corresponds to a group of audio frames/images.

Image data 623 along with other data 681 may be received by feature extractor 635. The feature extractor may create one or more feature vectors 636 which may represent the image data 623/other data 681. In certain examples, other data 681 may include data from image processing component which may include information about faces, gesture, etc. detected in the image data 623. For privacy protection purposes, in certain configurations any image processing/results thereof may be obtained from an image processing component located on device 110 or on a home remote component as opposed to a image processing component located on a cloud or other remote system 120 so that image data 623 is not sent remote from the user's home unless the system directed input detector component 585 has determined that the input is system directed. Though this may be adjusted depending on user preferences/system configuration.

The feature vector 636 may be passed to the user detector 625. The user detector 625 (which may use various components/operations of image processing component, user recognition component, etc.) may be configured to process image data 623 and/or feature vector 636 to determine information about the user's behavior which in turn may be used to determine if an input is system directed. For example, the user detector 625 may be configured to determine the user's position/behavior with respect to device 110/system 100. The user detector 625 may also be configured to determine whether a user's mouth is opening/closing in a manner that suggests the user is speaking. The user detector 625 may also be configured to determine whether a user is nodding or shaking his/her head. The user detector 625 may also be configured to determine whether a user's gaze is directed to the device 110, to another user, or to another object. For example, the use detector 625 may include, or be configured to use data from, a gaze detector. The user detector 625 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 625 may also be configured to determine a user's position/orientation such as facing another user, facing the device 110, whether their back is turned, etc. The user detector 625 may also be configured to determine relative positions of multiple users that appear in image data (and/or are speaking in audio data 111 which may also be considered by the user detector 625 along with feature vector 631), for example which users are closer to a device 110 and which are farther away. The user detector 625 (and/or other component) may also be configured to identify other objects represented in image data and determine whether objects are relevant to a dialog or system interaction (for example determining if a user is referring to an object through a movement or speech).

The user detector 625 may operate one or more models (e.g., one or more classifiers) to determine if certain situations are represented in the image data 623. For example the user detector 625 may employ a visual directedness classifier that may determine, for each face detected in the image data 623 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector 625 (or other component(s) such as those in an image processing) may be configured to track a face in image data to determine which faces represented may belong to a same person. The system may user IOU based tracker, a mean-shift based tracker, a particle filter based tracker or other technique.

The user detector 625 (or other component(s) such as those in a user recognition component) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 650 may then determine, based on information from the user detector 625 as based on the image data whether an input relating to the image data is system directed. The system directed image detector 650 may also operate on other input data, for example image data including raw image data 623, image data including feature data 636 based on raw image data, other data 681, or other data. The determination by the system directed image detector 650 may result in a score indicating whether the input is system directed based on the image data. If no audio data is available, the indication may be output as SDD result 642. If audio data is available, the indication may be sent to system directed detector 670 which may consider information from both system directed audio detector 640 and system directed image detector 650. The system directed detector 670 may then process the data from both system directed audio detector 640 and system directed image detector 650 to come up with an overall determination as to whether an input was system directed, which may be output as SDD result 642. The system directed detector 670 may consider not only data output from system directed audio detector 640 and system directed image detector 650 but also other data/metadata corresponding to the input (for example, image data/feature data 636, audio data/feature data 631, image data 623, audio data 111, or the like discussed with regard to FIG. 6. The system directed detector 670 may include one or more models which may analyze the various input data to make a determination regarding SDD result 642.

In one example the determination of the system directed detector 670 may be based on "AND" logic, for example determining an input is system directed only if affirmative data is received from both system directed audio detector 640 and system directed image detector 650. In another example the determination of the system directed detector 670 may be based on "OR" logic, for example determining an input is system directed if affirmative data is received from either system directed audio detector 640 or system directed image detector 650. In another example the data received from system directed audio detector 640 and system directed image detector 650 are weighted individually based on other information available to system directed detector 670 to determine to what extend audio and/or image data should impact the decision of whether an input is system directed.

The system directed input detector 585 may also receive information from a wakeword component 122. For example, an indication that a wakeword was detected (e.g., WW data 260) may be considered by the system directed input detector 585 (e.g., by system directed audio detector 640, system directed detector 670, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 592). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 111 or image data 623) sent to a remote system 120 that is outside a user's home or other direct control.

Figure 7:
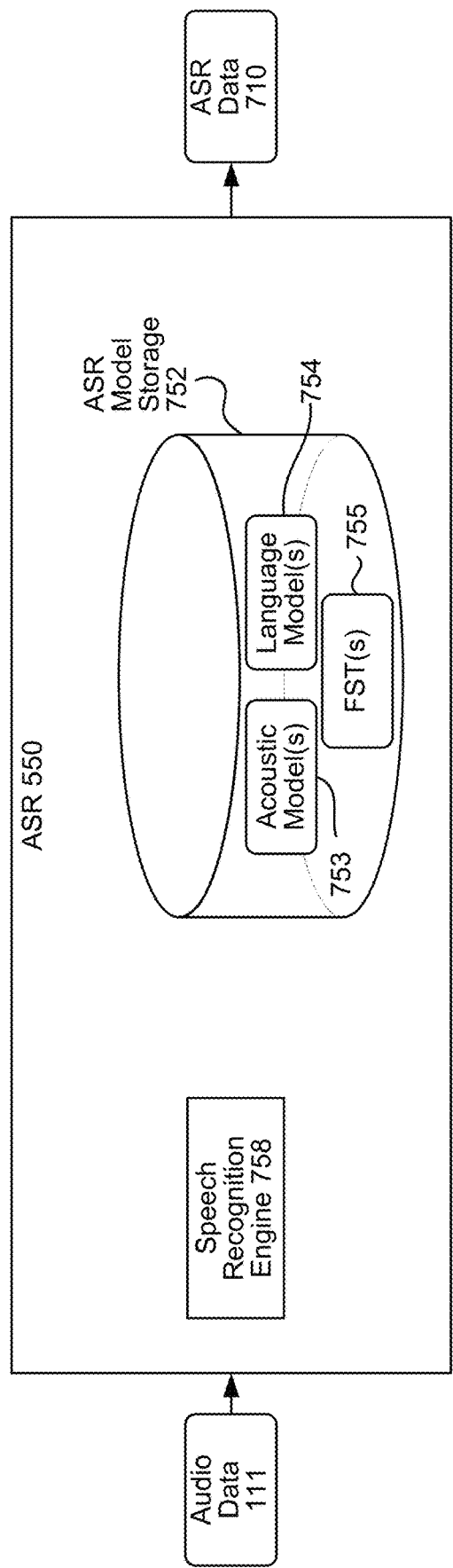
FIG. 7 is a conceptual diagram of an ASR component, according to embodiments of the present disclosure.

FIG. 7 is a conceptual diagram of an ASR component 550, according to embodiments of the present disclosure. The ASR component 550 may interpret a spoken natural language input based on the similarity between the spoken natural language input and pre-established language models 754 stored in an ASR model storage 752. For example, the ASR component 550 may compare the audio data with models for sounds (e.g., subword units or phonemes) and sequences of sounds to identify words that match the sequence of sounds spoken in the natural language input. Alternatively, the ASR component 550 may use a finite state transducer (FST) 755 to implement the language model functions.

When the ASR component 550 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 550 may output an ASR hypothesis that most likely matches the spoken natural language input, or may output multiple ASR hypotheses in the form of a lattice or an N-best list, with each ASR hypothesis corresponding to a respective score.

The ASR component 550 may include a speech recognition engine 758. The ASR component 550 receives audio data 111 (for example, received from a local device 110 having processed audio detected by a microphone by an acoustic front end (AFE) or other component). The speech recognition engine 758 compares the audio data 111 with acoustic models 753, language models 754, FST(s) 755, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, logarithmic filter-bank energies (LFBEs), neural network feature vector techniques, linear discriminant analysis, semi-tied covariance matrices, or other approaches known to those of skill in the art.

The speech recognition engine 758 may process the audio data 111 with reference to information stored in the ASR model storage 752. Feature vectors of the audio data 111 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 111 may be processed by one or more acoustic model(s) 753 to determine acoustic unit data. The acoustic unit data may include indicators of acoustic units detected in the audio data 111 by the ASR component 550. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 560) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 550 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 550 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 550 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
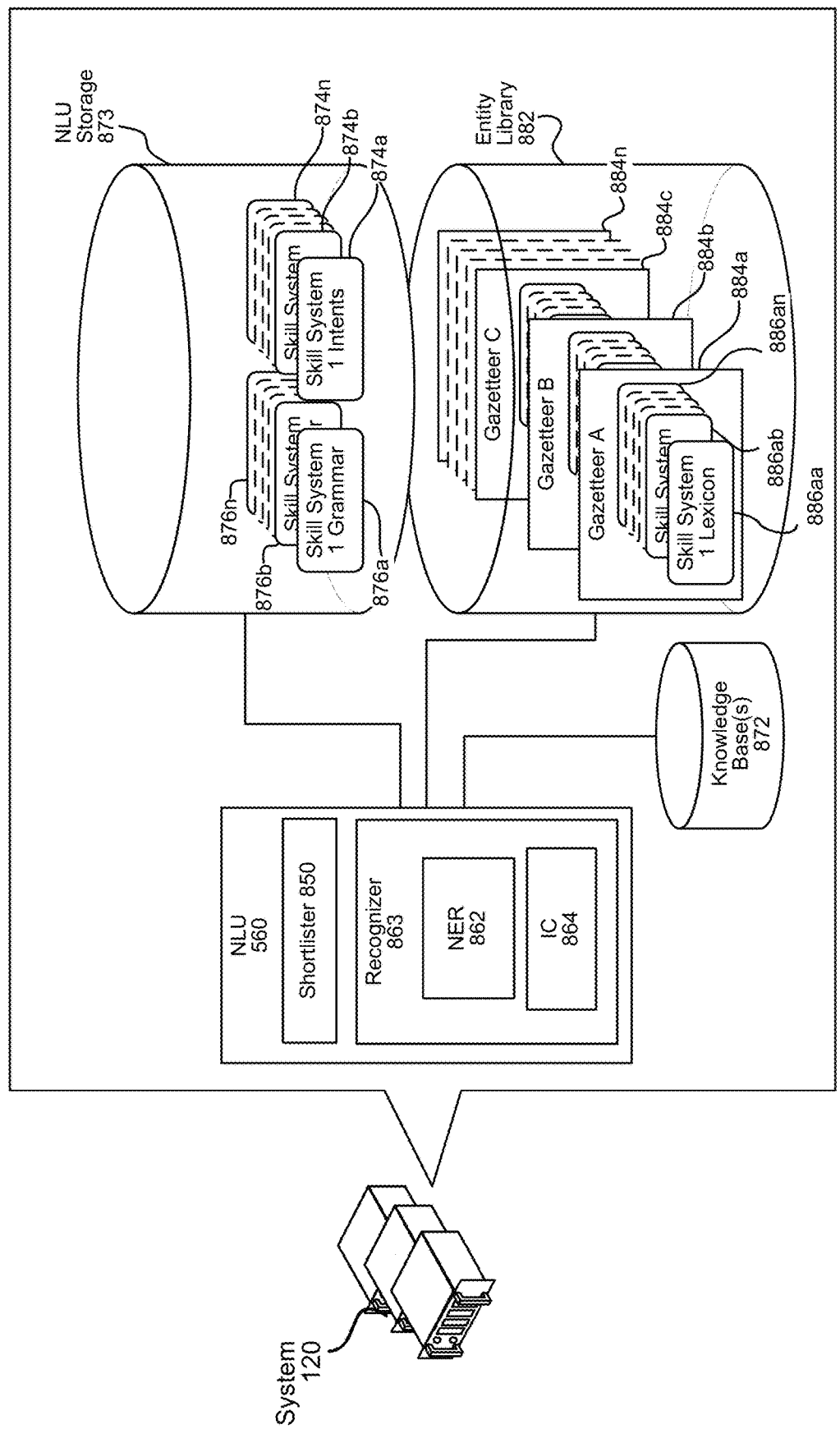
FIG. 8 is a conceptual diagram of how natural language processing is performed, according to embodiments of the present disclosure.
Figure 9:
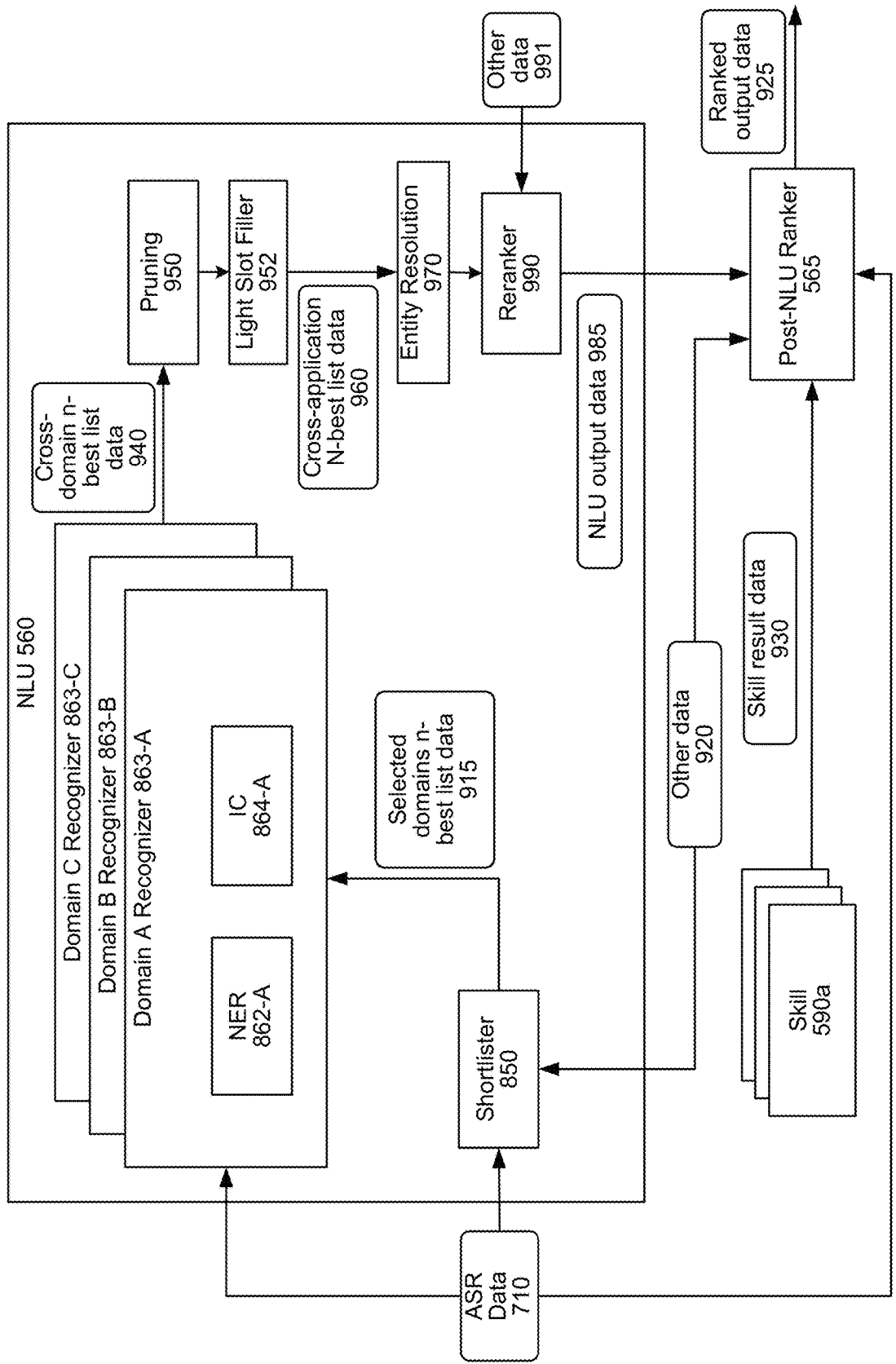
FIG. 9 is a conceptual diagram of how natural language processing is performed, according to embodiments of the present disclosure.

FIGS. 8 and 9 illustrates how the NLU component 560 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 560 may process text data including several ASR hypotheses of a single user input. For example, if the ASR component 550 outputs text data including an n-best list of ASR hypotheses, the NLU component 560 may process the text data with respect to all (or a portion of) the ASR hypotheses represented therein.

The NLU component 560 may annotate text data by parsing and/or tagging the text data. For example, for the text data "tell me the weather for Seattle," the NLU component 560 may tag "tell me the weather for Seattle" as an <OutputWeather> intent as well as separately tag "Seattle" as a location for the weather information.

The NLU component 560 may include a shortlister component 850. The shortlister component 850 selects skills that may execute with respect to ASR output data 710 input to the NLU component 560 (e.g., applications that may execute with respect to the user input). The ASR output data 710 (which may also be referred to as ASR data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 560 may process ASR output data 710 input thereto with respect to every skill of the system, either in parallel, in series, or using some combination thereof. By implementing a shortlister component 850, the NLU component 560 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 525 associated with a skill may provide the system(s) 120 with training text data representing sample user inputs that may be provided by a user to invoke the skill. For example, for a ride sharing skill, a skill system(s) 525 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 525 associated with the skill regarding whether the determined other user input structures are permissible, from the perspective of the skill system(s) 525, to be used to invoke the skill. The alternate user input structures may be derived by one or more trained models during model training and/or may be based on user input structures provided by different skills. The skill system(s) 525 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 525, and related sample user inputs potentially determined during training, as binary examples to train a model associated with a skill associated with the skill system(s) 525. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 560 may include one or more recognizers 863. In at least some embodiments, a recognizer 863 may be associated with a skill system 525 (e.g., the recognizer may be configured to interpret text data to correspond to the skill system 525). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 560) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884*a*) includes skill-indexed lexical information 886*aa* to 886*an*. A user's music domain lexical information might include album titles, artist names, and song names, for example, whereas a user's communications domain lexical information might include the names of contacts. Since every user's music collection and contact list is presumably different, this personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 560 may utilize gazetteer information (884*a*-884*n*) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent} <PlayMusic>, {artist name} rolling stones, {media type} SONG, and {song title} mother's little helper. For further example, the NER component 862 may tag "play songs by the rolling stones" as: {domain} Music, {intent} <PlayMusic>, {artist name} rolling stones, and {media type} SONG.

The shortlister component 850 may receive ASR output data 710 output from the ASR component 550 or output from the device 110b (as illustrated in FIG. 9). The ASR component 550 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 550. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 710.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 570. When the shortlister component 850 receives the ASR output data 710, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 710. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 530) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 530 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 530 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 560 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 560 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 560 may include multiple entity resolution components 970 and each entity resolution component 970 may be specific to one or more domains.

The NLU component 560 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 560 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 560 may perform NLU processing described above with respect to domains associated with skills wholly implemented as part of the system(s) 120 (e.g., designated 590 in FIG. 5A). The NLU component 560 may separately perform NLU processing described above with respect to domains associated with skills that are at least partially implemented as part of the skill system(s) 525. In an example, the shortlister component 850 may only process with respect to these latter domains. Results of these two NLU processing paths may be merged into NLU output data 985, which may be sent to a post-NLU ranker 565, which may be implemented by the system(s) 120.

The post-NLU ranker 565 may include a statistical component that produces a ranked list of intent/skill pairs with associated confidence scores. Each confidence score may indicate an adequacy of the skill's execution of the intent with respect to NLU results data associated with the skill. The post-NLU ranker 565 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 565. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 565 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 565 (or other scheduling component such as orchestrator component 530) may solicit the first skill and the second skill to provide potential result data 930 based on the first NLU hypothesis and the second NLU hypothesis, respectively. For example, the post-NLU ranker 565 may send the first NLU hypothesis to the first skill 590a along with a request for the first skill 590a to at least partially execute with respect to the first NLU hypothesis. The post-NLU ranker 565 may also send the second NLU hypothesis to the second skill 590b along with a request for the second skill 590b to at least partially execute with respect to the second NLU hypothesis. The post-NLU ranker 565 receives, from the first skill 590a, first result data 930a generated from the first skill 590a' s execution with respect to the first NLU hypothesis. The post-NLU ranker 565 also receives, from the second skill 590b, second results data 930b generated from the second skill 590b's execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 525 to locate the data to be output to a user. The result data 930 may also include an instruction. For example, if the user input corresponds to "turn on the light," the result data 930 may include an instruction causing the system to turn on a light associated with a profile of the device (110a/110b) and/or user.

The post-NLU ranker 565 may consider the first result data 930a and the second result data 930b to alter the first confidence score and the second confidence score of the first NLU hypothesis and the second NLU hypothesis, respectively. That is, the post-NLU ranker 565 may generate a third confidence score based on the first result data 930a and the first confidence score. The third confidence score may correspond to how likely the post-NLU ranker 565 determines the first skill will correctly respond to the user input. The post-NLU ranker 565 may also generate a fourth confidence score based on the second result data 930b and the second confidence score. One skilled in the art will appreciate that a first difference between the third confidence score and the fourth confidence score may be greater than a second difference between the first confidence score and the second confidence score. The post-NLU ranker 565 may also consider the other data 920 to generate the third confidence score and the fourth confidence score. While it has been described that the post-NLU ranker 565 may alter the confidence scores associated with first and second NLU hypotheses, one skilled in the art will appreciate that the post-NLU ranker 565 may alter the confidence scores of more than two NLU hypotheses. The post-NLU ranker 565 may select the result data 930 associated with the skill 590 with the highest altered confidence score to be the data output in response to the current user input. The post-NLU ranker 565 may also consider the ASR output data 710 to alter the NLU hypotheses confidence scores.

The orchestrator component 530 may, prior to sending the NLU results data 985 to the post-NLU ranker 565, associate intents in the NLU hypotheses with skills 590. For example, if a NLU hypothesis includes a <PlayMusic> intent, the orchestrator component 530 may associate the NLU hypothesis with one or more skills 590 that can execute the <PlayMusic> intent. Thus, the orchestrator component 530 may send the NLU results data 985, including NLU hypotheses paired with skills 590, to the post-NLU ranker 565. In response to ASR output data 710 corresponding to "what should I do for dinner today," the orchestrator component 530 may generates pairs of skills 590 with associated NLU hypotheses corresponding to:
  Skill 1/ NLU hypothesis including <Help> intent
  Skill 2/ NLU hypothesis including <Order> intent
  Skill 3/ NLU hypothesis including <DishType> intent The post-NLU ranker 565 queries each skill 590, paired with a NLU hypothesis in the NLU output data 985, to provide result data 930 based on the NLU hypothesis with which it is associated. That is, with respect to each skill, the post-NLU ranker 565 colloquially asks the each skill "if given this NLU hypothesis, what would you do with it." According to the above example, the post-NLU ranker 565 may send skills 590 the following data:
  Skill 1: First NLU hypothesis including <Help> intent indicator
  Skill 2: Second NLU hypothesis including <Order> intent indicator
  Skill 3: Third NLU hypothesis including <DishType> intent indicator The post-NLU ranker 565 may query each of the skills 590 in parallel or substantially in parallel.

A skill 590 may provide the post-NLU ranker 565 with various data and indications in response to the post-NLU ranker 565 soliciting the skill 590 for result data 930. A skill 590 may simply provide the post-NLU ranker 565 with an indication of whether or not the skill can execute with respect to the NLU hypothesis it received. A skill 590 may also or alternatively provide the post-NLU ranker 565 with output data generated based on the NLU hypothesis it received. In some situations, a skill 590 may need further information in addition to what is represented in the received NLU hypothesis to provide output data responsive to the user input. In these situations, the skill 590 may provide the post-NLU ranker 565 with result data 930 indicating slots of a framework that the skill 590 further needs filled or entities that the skill 590 further needs resolved prior to the skill 590 being able to provided result data 930 responsive to the user input. The skill 590 may also provide the post-NLU ranker 565 with an instruction and/or computer-generated speech indicating how the skill 590 recommends the system solicit further information needed by the skill 590. The skill 590 may further provide the post-NLU ranker 565 with an indication of whether the skill 590 will have all needed information after the user provides additional information a single time, or whether the skill 590 will need the user to provide various kinds of additional information prior to the skill 590 having all needed information. According to the above example, skills 590 may provide the post-NLU ranker 565 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 930 includes an indication provided by a skill 590 indicating whether or not the skill 590 can execute with respect to a NLU hypothesis; data generated by a skill 590 based on a NLU hypothesis; as well as an indication provided by a skill 590 indicating the skill 590 needs further information in addition to what is represented in the received NLU hypothesis.

The post-NLU ranker 565 uses the result data 930 provided by the skills 590 to alter the NLU processing confidence scores generated by the reranker 990. That is, the post-NLU ranker 565 uses the result data 930 provided by the queried skills 590 to create larger differences between the NLU processing confidence scores generated by the reranker 990. Without the post-NLU ranker 565, the system may not be confident enough to determine an output in response to a user input, for example when the NLU hypotheses associated with multiple skills are too close for the system to confidently determine a single skill 590 to invoke to respond to the user input. For example, if the system does not implement the post-NLU ranker 565, the system may not be able to determine whether to obtain output data from a general reference information skill or a medical information skill in response to a user input corresponding to "what is acne."

The post-NLU ranker 565 may prefer skills 590 that provide result data 930 responsive to NLU hypotheses over skills 590 that provide result data 930 corresponding to an indication that further information is needed, as well as skills 590 that provide result data 930 indicating they can provide multiple responses to received NLU hypotheses. For example, the post-NLU ranker 565 may generate a first score for a first skill 590a that is greater than the first skill's NLU confidence score based on the first skill 590a providing result data 930a including a response to a NLU hypothesis. For further example, the post-NLU ranker 565 may generate a second score for a second skill 590b that is less than the second skill's NLU confidence score based on the second skill 590b providing result data 930b indicating further information is needed for the second skill 590b to provide a response to a NLU hypothesis. Yet further, for example, the post-NLU ranker 565 may generate a third score for a third skill 590c that is less than the third skill's NLU confidence score based on the third skill 590c providing result data 930c indicating the third skill 590c can provide multiple responses to a NLU hypothesis.

The post-NLU ranker 565 may consider other data 920 in determining scores. The other data 920 may include rankings associated with the queried skills 590. A ranking may be a system ranking or a user-specific ranking. A ranking may indicate a veracity of a skill from the perspective of one or more users of the system. For example, the post-NLU ranker 565 may generate a first score for a first skill 590a that is greater than the first skill's NLU processing confidence score based on the first skill 590a being associated with a high ranking. For further example, the post-NLU ranker 565 may generate a second score for a second skill 590b that is less than the second skill's NLU processing confidence score based on the second skill 590b being associated with a low ranking.

The other data 920 may include information indicating whether or not the user that originated the user input has enabled one or more of the queried skills 590. For example, the post-NLU ranker 565 may generate a first score for a first skill 590a that is greater than the first skill's NLU processing confidence score based on the first skill 590a being enabled by the user that originated the user input. For further example, the post-NLU ranker 565 may generate a second score for a second skill 590b that is less than the second skill's NLU processing confidence score based on the second skill 590b not being enabled by the user that originated the user input. When the post-NLU ranker 565 receives the NLU results data 985, the post-NLU ranker 565 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 565 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 565 may increase the NLU processing confidence score associated with a first skill configured to output visual data and/or decrease the NLU processing confidence score associated with a second skill configured to output audio data.

The other data 920 may include information indicating the veracity of the result data 930 provided by a skill 590. For example, if a user says "tell me a recipe for pasta sauce," a first skill 590a may provide the post-NLU ranker 565 with first result data 930a corresponding to a first recipe associated with a five star rating and a second skill 590b may provide the post-NLU ranker 565 with second result data 930b corresponding to a second recipe associated with a one star rating. In this situation, the post-NLU ranker 565 may increase the NLU processing confidence score associated with the first skill 590a based on the first skill 590a providing the first result data 930a associated with the five star rating and/or decrease the NLU processing confidence score associated with the second skill 590b based on the second skill 590b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 565 may increase the NLU processing confidence score associated with a first skill 590a corresponding to a room service skill associated with the hotel and/or decrease the NLU processing confidence score associated with a second skill 590*b* corresponding to a food skill not associated with the hotel.

The other data 920 may include information indicating a location of the device and/or user that originated the user input. The system may be configured with skills 590 that may only operate with respect to certain geographic locations. For example, a user may provide a user input corresponding to "when is the next train to Portland." A first skill 590*a* may operate with respect to trains that arrive at, depart from, and pass through Portland, Oregon. A second skill 590*b* may operate with respect to trains that arrive at, depart from, and pass through Portland, Maine. If the device and/or user that originated the user input is located in Seattle, Washington, the post-NLU ranker 565 may increase the NLU processing confidence score associated with the first skill 590*a* and/or decrease the NLU processing confidence score associated with the second skill 590*b*. Likewise, if the device and/or user that originated the user input is located in Boston, Massachusetts, the post-NLU ranker 565 may increase the NLU processing confidence score associated with the second skill 590*b* and/or decrease the NLU processing confidence score associated with the first skill 590*a*.

The other data 920 may include information indicating a time of day. The system may be configured with skills 590 that operate with respect to certain times of day. For example, a user may provide a user input corresponding to "order me food." A first skill 590*a* may generate first result data 930*a* corresponding to breakfast. A second skill 590*b* may generate second result data 930*b* corresponding to dinner. If the system(s) 120 receives the user input in the morning, the post-NLU ranker 565 may increase the NLU processing confidence score associated with the first skill 590*a* and/or decrease the NLU processing score associated with the second skill 590*b*. If the system(s) 120 receives the user input in the afternoon or evening, the post-NLU ranker 565 may increase the NLU processing confidence score associated with the second skill 590*b* and/or decrease the NLU processing confidence score associated with the first skill 590*a*.

The other data 920 may include information indicating user preferences. The system may include multiple skills 590 configured to execute in substantially the same manner. For example, a first skill 590*a* and a second skill 590*b* may both be configured to order food from respective restaurants. The system may store a user preference (e.g., in the profile storage 570) that is associated with the user that provided the user input to the system(s) 120 as well as indicates the user prefers the first skill 590*a* over the second skill 590*b*. Thus, when the user provides a user input that may be executed by both the first skill 590*a* and the second skill 590*b*, the post-NLU ranker 565 may increase the NLU processing confidence score associated with the first skill 590*a* and/or decrease the NLU processing confidence score associated with the second skill 590*b*.

The other data 920 may include information indicating system usage history associated with the user that originated the user input. For example, the system usage history may indicate the user originates user inputs that invoke a first skill 590*a* more often than the user originates user inputs that invoke a second skill 590*b*. Based on this, if the present user input may be executed by both the first skill 590*a* and the second skill 590*b*, the post-NLU ranker 565 may increase the NLU processing confidence score associated with the first skill 590*a* and/or decrease the NLU processing confidence score associated with the second skill 590*b*.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 565 may increase the NLU processing confidence score associated with a first skill 590*a* that generates audio data. The post-NLU ranker 565 may also or alternatively decrease the NLU processing confidence score associated with a second skill 590*b* that generates image data or video data.

The other data 920 may include information indicating how long it took a skill 590 to provide result data 930 to the post-NLU ranker 565. When the post-NLU ranker 565 multiple skills 590 for result data 930, the skills 590 may respond to the queries at different speeds. The post-NLU ranker 565 may implement a latency budget. For example, if the post-NLU ranker 565 determines a skill 590 responds to the post-NLU ranker 565 within a threshold amount of time from receiving a query from the post-NLU ranker 565, the post-NLU ranker 565 may increase the NLU processing confidence score associated with the skill 590. Conversely, if the post-NLU ranker 565 determines a skill 590 does not respond to the post-NLU ranker 565 within a threshold amount of time from receiving a query from the post-NLU ranker 565, the post-NLU ranker 565 may decrease the NLU processing confidence score associated with the skill 590.

It has been described that the post-NLU ranker 565 uses the other data 920 to increase and decrease NLU processing confidence scores associated with various skills 590 that the post-NLU ranker 565 has already requested result data from. Alternatively, the post-NLU ranker 565 may use the other data 920 to determine which skills 590 to request result data from. For example, the post-NLU ranker 565 may use the other data 920 to increase and/or decrease NLU processing confidence scores associated with skills 590 associated with the NLU results data 985 output by the NLU component 560. The post-NLU ranker 565 may select n-number of top scoring altered NLU processing confidence scores. The post-NLU ranker 565 may then request result data 930 from only the skills 590 associated with the selected n-number of NLU processing confidence scores.

As described, the post-NLU ranker 565 may request result data 930 from all skills 590 associated with the NLU results data 985 output by the NLU component 560. Alternatively, the system(s) 120 may prefer result data 930 from skills implemented entirely by the system(s) 120 rather than skills at least partially implemented by the skill system(s) 525. Therefore, in the first instance, the post-NLU ranker 565 may request result data 930 from only skills associated with the NLU results data 985 and entirely implemented by the system(s) 120. The post-NLU ranker 565 may only request result data 930 from skills associated with the NLU results data 985, and at least partially implemented by the skill system(s) 525, if none of the skills, wholly implemented by the system(s) 120, provide the post-NLU ranker 565 with result data 930 indicating either data response to the NLU results data 985, an indication that the skill can execute the user input, or an indication that further information is needed.

As indicated above, the post-NLU ranker 565 may request result data 930 from multiple skills 590. If one of the skills 590 provides result data 930 indicating a response to a NLU hypothesis and the other skills provide result data 930 indicating either they cannot execute or they need further information, the post-NLU ranker 565 may select the result data 930 including the response to the NLU hypothesis as the data to be output to the user. If more than one of the skills 590 provides result data 930 indicating responses to NLU hypotheses, the post-NLU ranker 565 may consider the other data 920 to generate altered NLU processing confidence scores, and select the result data 930 of the skill associated with the greatest score as the data to be output to the user.

A system that does not implement the post-NLU ranker 565 may select the highest scored NLU hypothesis in the NLU results data 985. The system may send the NLU hypothesis to a skill 590 associated therewith along with a request for output data. In some situations, the skill 590 may not be able to provide the system with output data. This results in the system indicating to the user that the user input could not be processed even though another skill associated with lower ranked NLU hypothesis could have provided output data responsive to the user input.

The post-NLU ranker 565 reduces instances of the aforementioned situation. As described, the post-NLU ranker 565 queries multiple skills associated with the NLU results data 985 to provide result data 930 to the post-NLU ranker 565 prior to the post-NLU ranker 565 ultimately determining the skill 590 to be invoked to respond to the user input. Some of the skills 590 may provide result data 930 indicating responses to NLU hypotheses while other skills 590 may providing result data 930 indicating the skills cannot provide responsive data. Whereas a system not implementing the post-NLU ranker 565 may select one of the skills 590 that could not provide a response, the post-NLU ranker 565 only selects a skill 590 that provides the post-NLU ranker 565 with result data corresponding to a response, indicating further information is needed, or indicating multiple responses can be generated.

The post-NLU ranker 565 may select result data 930, associated with the skill 590 associated with the highest score, for output to the user. Alternatively, the post-NLU ranker 565 may output ranked output data 925 indicating skills 590 and their respective post-NLU ranker rankings. Since the post-NLU ranker 565 receives result data 930, potentially corresponding to a response to the user input, from the skills 590 prior to post-NLU ranker 565 selecting one of the skills or outputting the ranked output data 925, little to no latency occurs from the time skills provide result data 930 and the time the system outputs responds to the user.

If the post-NLU ranker 565 selects result audio data to be output to a user and the system determines content should be output audibly, the post-NLU ranker 565 (or another component of the system(s) 120) may cause the device 110a and/or the device 110b to output audio corresponding to the result audio data. If the post-NLU ranker 565 selects result text data to output to a user and the system determines content should be output visually, the post-NLU ranker 565 (or another component of the system(s) 120) may cause the device 110b to display text corresponding to the result text data. If the post-NLU ranker 565 selects result audio data to output to a user and the system determines content should be output visually, the post-NLU ranker 565 (or another component of the system(s) 120) may send the result audio data to the ASR component 550. The ASR component 550 may generate output text data corresponding to the result audio data. The system(s) 120 may then cause the device 110b to display text corresponding to the output text data. If the post-NLU ranker 565 selects result text data to output to a user and the system determines content should be output audibly, the post-NLU ranker 565 (or another component of the system(s) 120) may send the result text data to the TTS component 580. The TTS component 580 may generate output audio data (corresponding to computer-generated speech) based on the result text data. The system(s) 120 may then cause the device 110a and/or the device 110b to output audio corresponding to the output audio data.

As described, a skill 590 may provide result data 930 either indicating a response to the user input, indicating more information is needed for the skill 590 to provide a response to the user input, or indicating the skill 590 cannot provide a response to the user input. If the skill 590 associated with the highest post-NLU ranker score provides the post-NLU ranker 565 with result data 930 indicating a response to the user input, the post-NLU ranker 565 (or another component of the system(s) 120, such as the orchestrator component 530) may simply cause content corresponding to the result data 930 to be output to the user. For example, the post-NLU ranker 565 may send the result data 930 to the orchestrator component 530. The orchestrator component 530 may cause the result data 930 to be sent to the device (110a/110b), which may output audio and/or display text corresponding to the result data 930. The orchestrator component 530 may send the result data 930 to the ASR component 550 to generate output text data and/or may send the result data 930 to the TTS component 580 to generate output audio data, depending on the situation.

The skill 590 associated with the highest post-NLU ranker score may provide the post-NLU ranker 565 with result data 930 indicating more information is needed as well as instruction data. The instruction data may indicate how the skill 590 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 565 may simply cause the received instruction data be output by the device (110a/110b). Alternatively, the instruction data may be in a format that is not capable of being output by the device (110a/110b). When this occurs, the post-NLU ranker 565 may cause the ASR component 550 or the TTS component 580 to process the instruction data, depending on the situation, to generate instruction data that may be output by the device (110a/110b). Once the user provides the system with all further information needed by the skill 590, the skill 590 may provide the system with result data 930 indicating a response to the user input, which may be output by the system as detailed above.

The system may include "informational" skills 590 that simply provide the system with information, which the system outputs to the user. The system may also include "transactional" skills 590 that require a system instruction to execute the user input. Transactional skills 590 include ride sharing skills, flight booking skills, etc. A transactional skill 590 may simply provide the post-NLU ranker 565 with result data 930 indicating the transactional skill 590 can execute the user input. The post-NLU ranker 565 may then cause the system to solicit the user for an indication that the system is permitted to cause the transactional skill 590 to execute the user input. The user-provided indication may be an audible indication or a tactile indication (e.g., activation of a virtual button or input of text via a virtual keyboard). In response to receiving the user-provided indication, the system may provide the transactional skill 590 with data corresponding to the indication. In response, the transactional skill 590 may execute the command (e.g., book a flight, book a train ticket, etc.). Thus, while the system may not further engage an informational skill 590 after the informational skill 590 provides the post-NLU ranker 565 with result data 930, the system may further engage a transactional skill 590 after the transactional skill 590 provides the post-NLU ranker 565 with result data 930 indicating the transactional skill 590 may execute the user input.

In some instances, the post-NLU ranker 565 may generate respective scores for first and second skills that are too close (e.g., are not different by at least a threshold difference) for the post-NLU ranker 565 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 530, post-NLU ranker 565, shortlister 850, or other component may be trained and operated according to various machine learning techniques.

Figure 10:
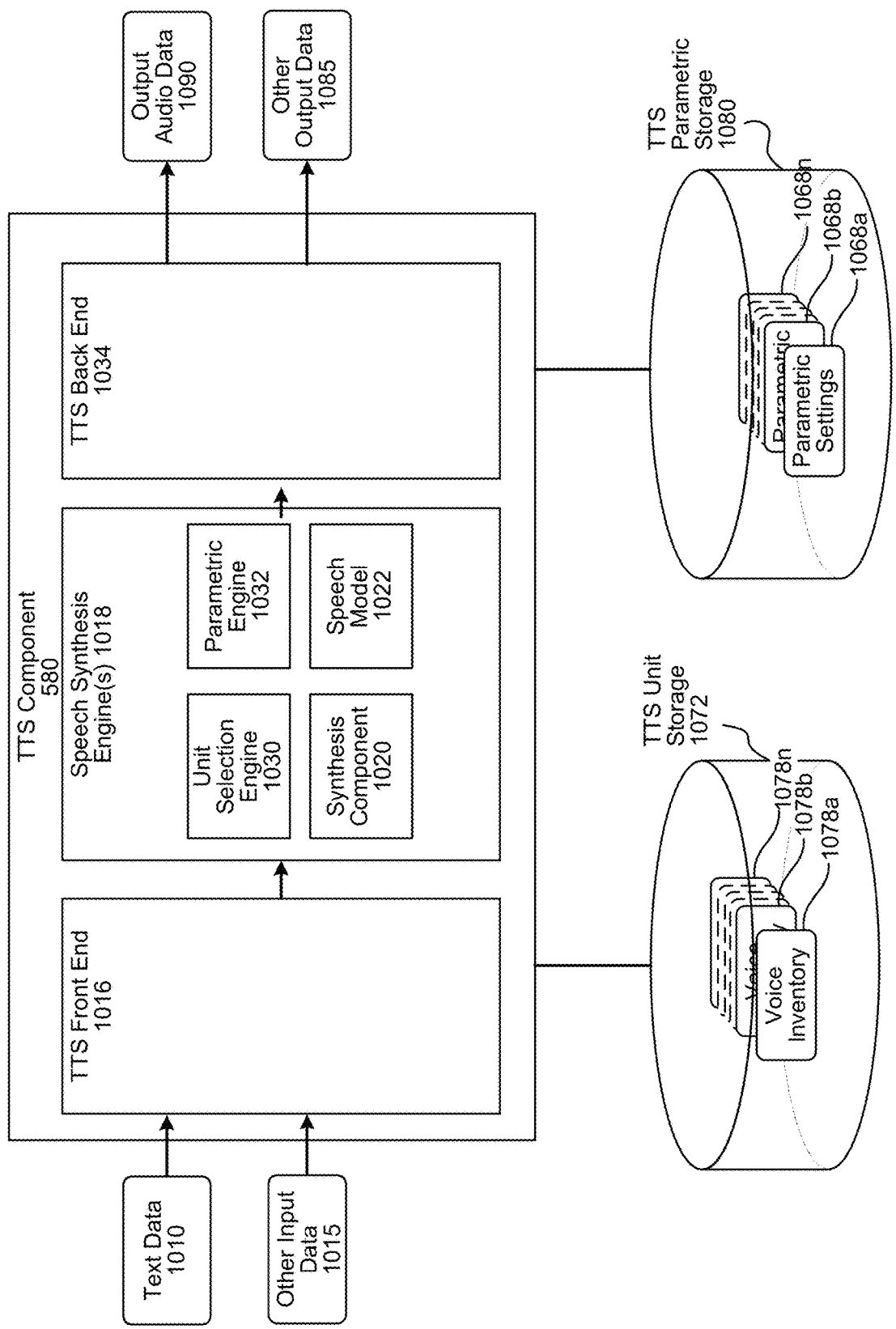
FIG. 10 is a conceptual diagram of text-to-speech components according to embodiments of the present disclosure.

Components of a system that may be used to perform unit selection, parametric TTS processing, and/or model-based audio synthesis are shown in FIG. 10. As shown in FIG. 10, the TTS component/processor 580 may include a TTS front end 1016, a speech synthesis engine 1018, TTS unit storage 1072, TTS parametric storage 1080, and a TTS back end 1034. The TTS unit storage 1072 may include, among other things, voice inventories 1078a-1078n that may include pre-recorded audio segments (called units) to be used by the unit selection engine 1030 when performing unit selection synthesis as described below. The TTS parametric storage 1080 may include, among other things, parametric settings 1068a-1068n that may be used by the parametric synthesis engine 1032 when performing parametric synthesis as described below. A particular set of parametric settings 1068 may correspond to a particular voice profile (e.g., whispered speech, excited speech, etc.).

In various embodiments of the present disclosure, model-based synthesis of audio data may be performed using by a speech model 1022 and a TTS front end 1016. The TTS front end 1016 may be the same as front ends used in traditional unit selection or parametric systems. In other embodiments, some or all of the components of the TTS front end 1016 are based on other trained models. The present disclosure is not, however, limited to any particular type of TTS front end 1016. The speech model 1022 may be used to synthesize speech without requiring the TTS unit storage 1072 or the TTS parametric storage 1080, as described in greater detail below.

TTS component receives text data 1010. Although the text data 1010 in FIG. 10 is input into the TTS component 580, it may be output by other component(s) (such as a skill 590, NLU component 560, NLG component 579 or other component) and may be intended for output by the system. Thus in certain instances text data 1010 may be referred to as "output text data." Further, the data 1010 may not necessarily be text, but may include other data (such as symbols, code, other data, etc.) that may reference text (such as an indicator of a word) that is to be synthesized. Thus data 1010 may come in a variety of forms. The TTS front end 1016 transforms the data 1010 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1018. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1010, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1016 may also process other input data 1015, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1010 and/or the text for a TTS request may be accompanied by separate metadata indicating what text should be whispered (or have some other indicated audio characteristic). The speech synthesis engine 1018 may compare the annotated phonetic units models and information stored in the TTS unit storage 1072 and/or TTS parametric storage 1080 for converting the input text into speech. The TTS front end 1016 and speech synthesis engine 1018 may include their own controller(s)/processor(s) and memory or they may use the controller/processor and memory of the server 120, device 110, or other device, for example. Similarly, the instructions for operating the TTS front end 1016 and speech synthesis engine 1018 may be located within the TTS component 580, within the memory and/or storage of the server 120, device 110, or within an external device.

Text data 1010 input into the TTS component 580 may be sent to the TTS front end 1016 for processing. The front end 1016 may include components for performing text normalization, linguistic analysis, linguistic prosody generation, or other such components. During text normalization, the TTS front end 1016 may first process the text input and generate standard text, converting such things as numbers, abbreviations (such as Apt., St., etc.), symbols ($, %, etc.) into the equivalent of written out words.

During linguistic analysis, the TTS front end 1016 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 580 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1072. The linguistic analysis performed by the TTS front end 1016 may also identify different grammatical components such as prefixes, suffixes, phrases, punctuation, syntactic boundaries, or the like. Such grammatical components may be used by the TTS component 580 to craft a natural-sounding audio waveform output. The language dictionary may also include letter-to-sound rules and other tools that may be used to pronounce previously unidentified words or letter combinations that may be encountered by the TTS component 580. Generally, the more information included in the language dictionary, the higher quality the speech output.

Based on the linguistic analysis the TTS front end 1016 may then perform linguistic prosody generation where the phonetic units are annotated with desired prosodic characteristics, also called acoustic features, which indicate how the desired phonetic units are to be pronounced in the eventual output speech. During this stage the TTS front end 1016 may consider and incorporate any prosodic annotations that accompanied the text input to the TTS component 580. Such acoustic features may include syllable-level features, word-level features, emotion, speaker, accent, language, pitch, energy, duration, and the like. Application of acoustic features may be based on prosodic models available to the TTS component 580. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1016, which may be referred to as a symbolic linguistic representation, may include a sequence of phonetic units annotated with prosodic characteristics. This symbolic linguistic representation may be sent to the speech synthesis engine 1018, which may also be known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, described further below, a unit selection engine 1030 matches the symbolic linguistic representation created by the TTS front end 1016 against a database of recorded speech, such as a database (e.g., TTS unit storage 1072) storing information regarding one or more voice corpuses (e.g., voice inventories 1078a-n). Each voice inventory may correspond to various segments of audio that was recorded by a speaking human, such as a voice actor, where the segments are stored in an individual inventory 1078 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1030 may then use the information about each unit to select units to be joined together to form the speech output.

The unit selection engine 1030 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1020) to form output audio data 1090 representing synthesized speech. Using all the information in the unit database, a unit selection engine 1030 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1020) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 580 may be configured to perform TTS processing in multiple languages. For each language, the TTS component 580 may include specially configured data, instructions and/or components to synthesize speech in the desired language(s). To improve performance, the TTS component 580 may revise/update the contents of the TTS unit storage 1072 based on feedback of the results of TTS processing, thus enabling the TTS component 580 to improve speech synthesis.

The TTS unit storage 1072 may be customized for an individual user based on his/her individualized desired speech output. In particular, the speech unit stored in a unit database may be taken from input audio data of the user speaking. For example, to create the customized speech output of the system, the system may be configured with multiple voice inventories 1078a-1078n, where each unit database is configured with a different "voice" to match desired speech qualities. Such voice inventories may also be linked to user accounts. The voice selected by the TTS component 580 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1078 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1068) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1072 or in another storage component. For example, different unit selection databases may be stored in TTS unit storage 1072. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 580 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1032 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1032 may lead to a number of potential audio output sequences. Based on the acoustic model and other potential models, the potential audio output sequences may be scored according to a confidence level of the parametric synthesis engine 1032. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1068, which may represent acoustic settings matching a particular parametric "voice", may be used by the synthesis component 1020 to ultimately create the output audio data 1090.

When performing unit selection, after a unit is selected by the unit selection engine 1030, the audio data corresponding to the unit may be passed to the synthesis component 1020. The synthesis component 1020 may then process the audio data of the unit to create modified audio data where the modified audio data reflects a desired audio quality. The synthesis component 1020 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 580. For each unit that corresponds to the selected portion, the synthesis component 1020 may process the audio data for that unit to create a modified unit audio data. The modified unit audio data may then be concatenated to form the output audio data 1090. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 580. In that case, other output data 1085 may be output along with the output audio data 1090 so that an ultimate playback device (e.g., device 110) receives instructions for playback that can assist in creating the desired output audio. Thus, the other output data 1085 may include instructions or other data indicating playback device settings (such as volume, playback rate, etc.) or other data indicating how output audio data including synthesized speech should be output. For example, for whispered speech, the output audio data 1090 may include other output data 1085 that may include a prosody tag or other indicator that instructs the device 110 to slow down the playback of the output audio data 1090, thus making the ultimate audio sound more like whispered speech, which is typically slower than normal speech. In another example, the other output data 1085 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
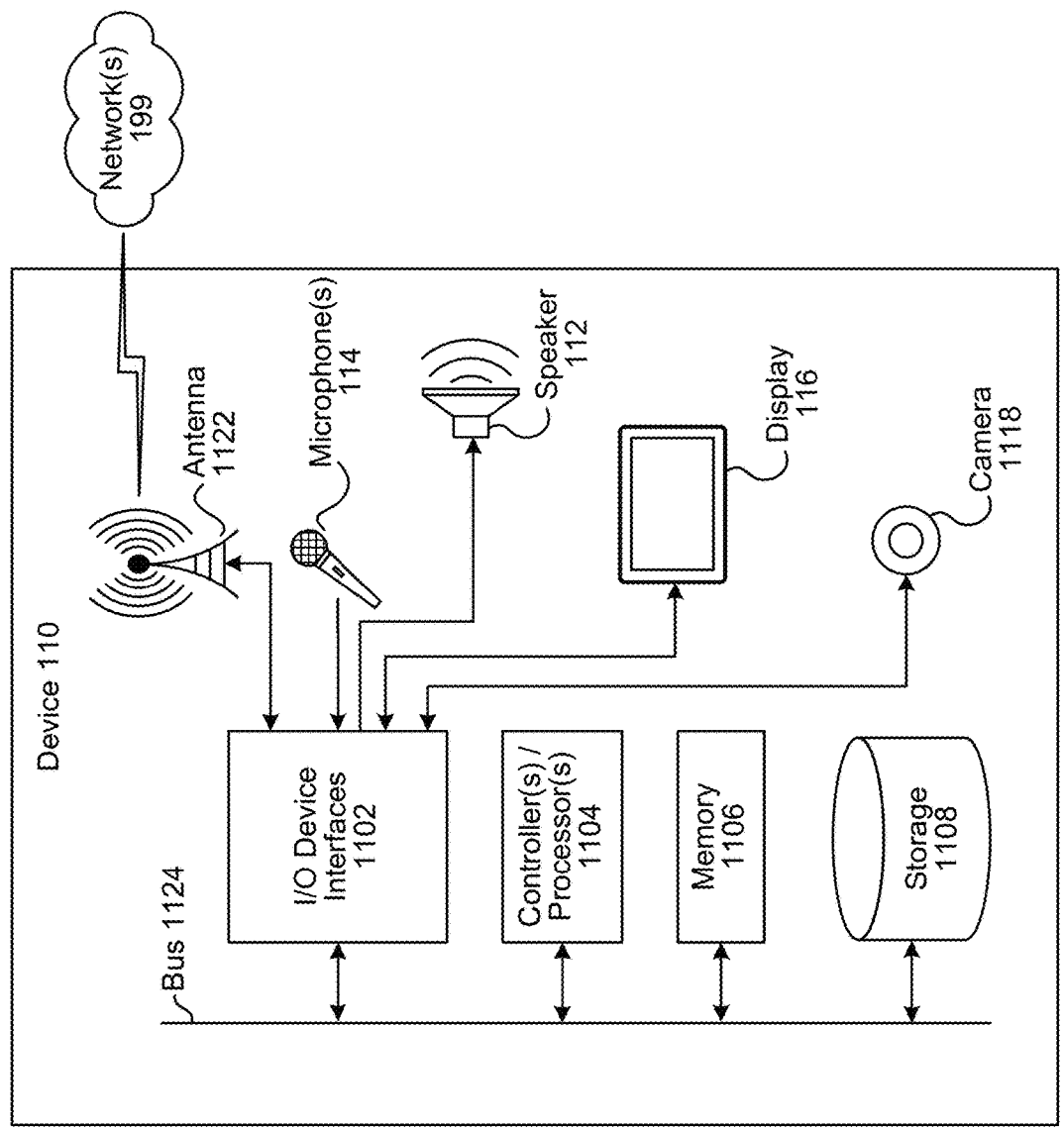
FIG. 11 is a block diagram conceptually illustrating example components of a device, according to embodiments of the present disclosure.
Figure 12:
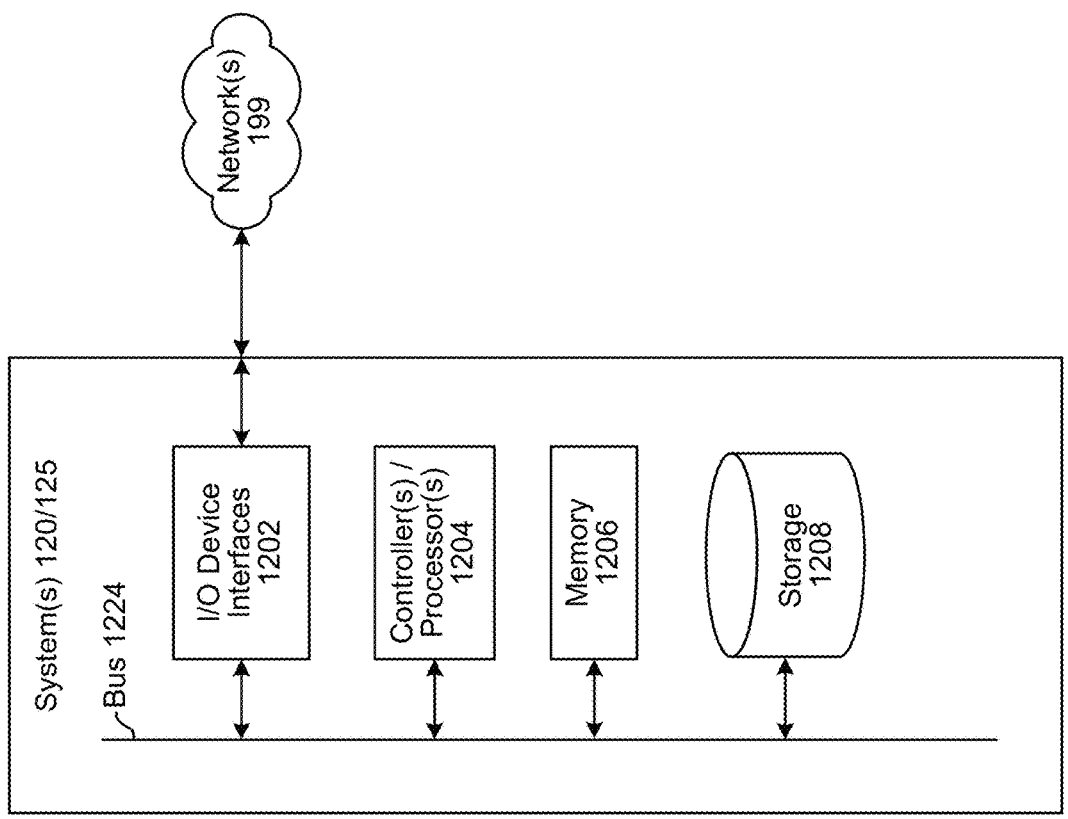
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system 120, which may assist with ASR processing, NLU processing, etc., and a skill system 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/525) may be included in the overall system 100 of the present disclosure, such as one or more natural language processing systems 120 for performing ASR processing, one or more natural language processing systems 120 for performing NLU processing, one or more skill systems 525, etc. In operation, each of these systems may include computer-readable and computer-executable instructions that reside on the respective device (120/525), as will be discussed further below.

Each of these devices (110/120/525) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/525) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (1102/1202).

Computer instructions for operating each device (110/120/525) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/525) includes input/output device interfaces (1102/1202). A variety of components may be connected through the input/output device interfaces (1102/1202), as will be discussed further below. Additionally, each device (110/120/525) may include an address/data bus (1620/1224) for conveying data among components of the respective device. Each component within a device (110/120/525) may also be directly connected to other components in addition to (or instead of) being connected to other components across the bus (1620/1224).

Referring to FIG. 11, the device 110 may include input/output device interfaces 1102 that connect to a variety of components such as an audio output component such as a speaker 112, a wired headset or a wireless headset (not illustrated), or other component capable of outputting audio. The device 110 may also include an audio capture component. The audio capture component may be, for example, a microphone 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 120, or a skill system 525 may include their own dedicated processors, memory, and/or storage. Alternatively, one or more of the components of the device(s) 110, the natural language command processing system 120, or a skill system 525 may utilize the I/O interfaces (1102/1202), processor(s) (1104/1204), memory (1106/1206), and/or storage (1108/1208) of the device(s) 110, natural language command processing system 120, or the skill system 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 525, as described herein, are illustrative, and may be located as a stand-alone device or may be included, in whole or in part, as a component of a larger device or system. As can be appreciated, a number of components may exist either on a system 120 and/or on device 110. For example, language processing 592 (which may include ASR 550), language output 593 (which may include NLG 579 and TTS 580), etc., for example as illustrated in FIGS. 5A and 5B. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
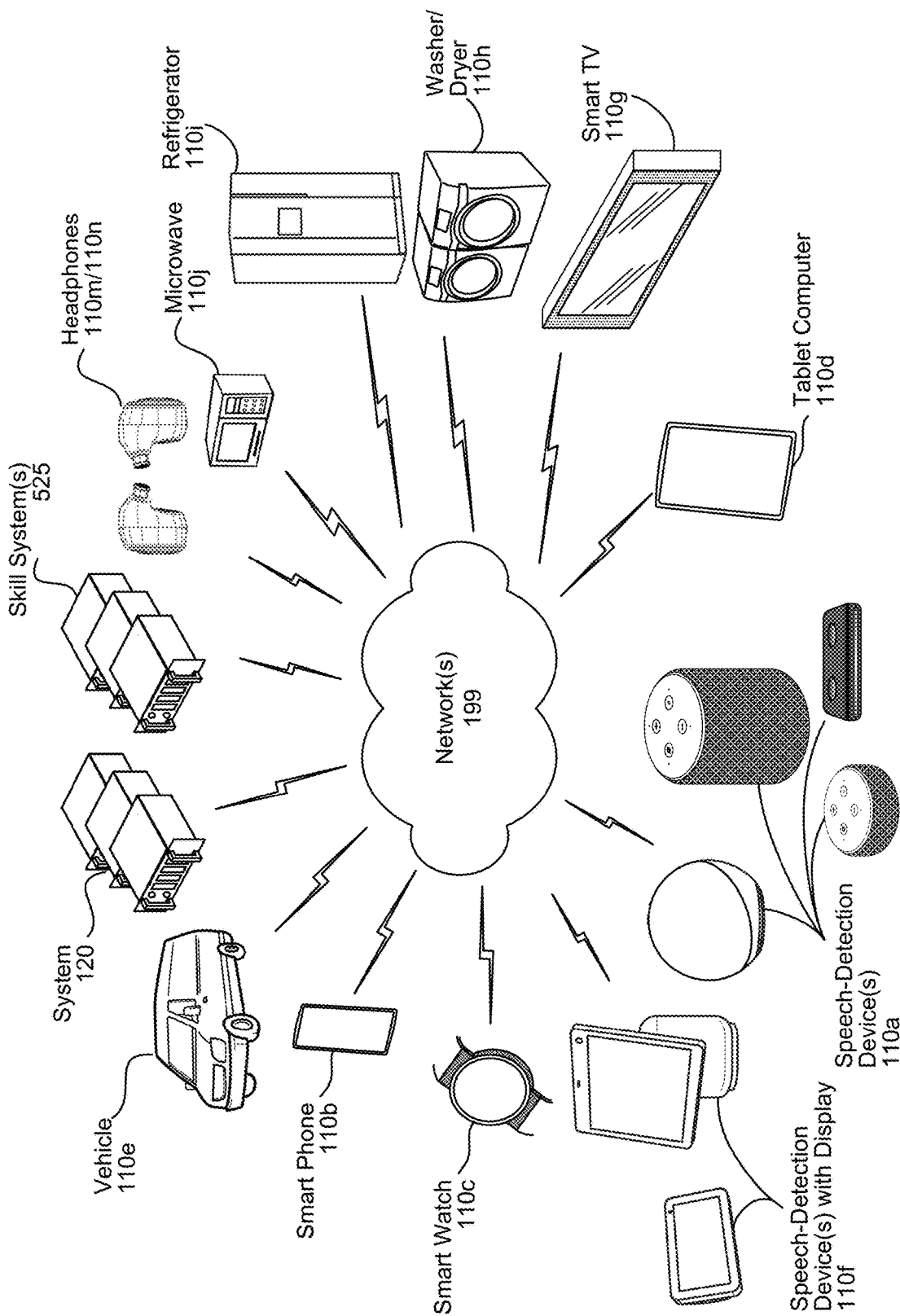
FIG. 13 illustrates an example of a computer network for use with the overall system, according to embodiments of the present disclosure.

As illustrated in FIG. 13, multiple devices (110*a*-110*n*, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   operating a first device using a first wakeword component configured to detect a first wakeword in received audio, the first wakeword component comprising a first convolutional neural network (CNN) encoder and a first convolutional recurrent neural network (CRNN) decoder corresponding to the first wakeword;
   determining a request to configure the first device to detect a second wakeword;
   determining updated wakeword component data comprising:
      first data representing the first CNN encoder,
      second data representing the first CRNN decoder, and
      third data representing a second CRNN decoder corresponding to the second wakeword;
   sending the updated wakeword component data to the first device;
   using the updated wakeword component data to configure an updated wakeword component for operation by the first device;
   receiving, by the first device, input audio data representing an utterance;
   processing the input audio data using the first CNN encoder to determine first encoded audio data comprising a plurality of feature vectors representing acoustic units of the utterance;
   processing the first encoded audio data using the first CRNN decoder to determine a first likelihood the utterance included the first wakeword;
   processing the first encoded audio data using the second CRNN decoder to determine a second likelihood the utterance included the second wakeword; and
   based at least in part on the first likelihood or the second likelihood, causing speech processing to be performed using data representing the utterance.

2. The computer-implemented method of claim 1, further comprising:
   determining, by the first CRNN decoder, first time data corresponding to detection of the first wakeword;
   determining, by the second CRNN decoder, second time data corresponding to detection of the second wakeword; and processing the first time data and the second time data to determine the first wakeword was detected within a first time of the second wakeword,
wherein causing the speech processing to be performed is based at least in part on the first wakeword being detected within the first time of the second wakeword.

3. The computer-implemented method of claim 1, further comprising:
determining a second request to configure the first device to detect a third wakeword;
determining second updated wakeword component data comprising:
first data representing the first CNN encoder,
second data representing the first CRNN decoder,
third data representing the second CRNN decoder, and
fourth data representing a third CRNN decoder corresponding to the third wakeword;
sending the second updated wakeword component data to the first device; and
using the second updated wakeword component data to configure a further updated wakeword component for operation by the first device.

4. The computer-implemented method of claim 1, further comprising:
operating a second device using a second wakeword component configured to detect the first wakeword in received audio, the second wakeword component comprising the first CNN encoder and the first CRNN decoder;
determining a request to configure the second device to detect a third wakeword;
determining second updated wakeword component data comprising:
first data representing the first CNN encoder,
second data representing the first CRNN decoder, and
fourth data representing a third CRNN decoder corresponding to the third wakeword;
sending the second updated wakeword component data to the second device; and
using the second updated wakeword component data to configure a second updated wakeword component for operation by the second device.

5. A computer-implemented method, comprising:
receiving audio data representing audio detected by a first device;
processing the audio data using a first encoder, which is trained to output data for at least a first decoder and a second decoder, to determine first encoded audio data, wherein the first encoder comprises a first machine learning model including first neural network layers configured to process audio data into encoded audio data, and wherein the first machine learning model is trained using training audio data representing audio samples, the audio samples including first audio samples corresponding to a first wakeword and second audio samples corresponding to a second wakeword;
receiving, by the first decoder, the first encoded audio data;
processing, using the first decoder, the first encoded audio data to determine first data representing that the audio included a first wakeword;
receiving, by the second decoder different from the first decoder, the first encoded audio data;
processing, using the second decoder, the first encoded audio data to determine second data representing that the audio included a second wakeword; and based at least in part on the first data or the second data, causing further processing to be performed using data representing the audio.

6. The computer-implemented method of claim 5, further comprising:
determining, based at least in part on the first data, that the audio included the first wakeword; and
in response to the audio including the first wakeword, sending the audio data to a first component associated with the first wakeword.

7. The computer-implemented method of claim 5, further comprising:
sending, from the first device to a second device, a request to enable a third wakeword with respect to the first device;
receiving, by the first device from the second device, first wakeword component data including:
third data corresponding to the first encoder,
fourth data corresponding to the first decoder,
fifth data corresponding to the second decoder, and
sixth data corresponding to a third decoder configured to process encoded audio data to determine when input audio data included a representation of the third wakeword; and
causing the first device to enable performing wakeword detection using the first wakeword component data.

8. The computer-implemented method of claim 5, further comprising:
sending, from the first device to a second device, a request to enable a third wakeword with respect to the first device;
receiving, by the first device from the second device, third data corresponding to a third decoder configured to process encoded audio data to determine when input audio data included a representation of the third wakeword; and
causing the first device to enable performing wakeword detection using the third data.

9. The computer-implemented method of claim 5, wherein:
the first data includes first time data corresponding to detection of the first wakeword;
the second data includes second time data corresponding to detection of the second wakeword;
the method further comprises processing the first time data and the second time data to determine the first wakeword was detected within a first time of the second wakeword; and
the further processing is caused to be performed based at least in part on the first wakeword being detected within the first time of the second wakeword.

10. The computer-implemented method of claim 9, wherein:
the second wakeword corresponds to a first assistant voice component; and
the method further comprises:
receiving second audio data representing second audio;
processing the second audio data using the first encoder to determine second encoded audio data;
processing the second encoded audio data using the first decoder to determine:
that the second audio included the first wakeword, and
third time data corresponding to detection of the first wakeword as part of the second audio;
processing the second encoded audio data using a third decoder to determine:

that the second audio included a third wakeword corresponding to a second assistant voice component different from the first assistant voice component, and
fourth time data corresponding to detection of the third wakeword as part of the second audio;
processing the third time data and the fourth time data to determine the first wakeword was detected within a second time of the third wakeword as part of the second audio; and
based at least in part on the first wakeword being detected within the second time of the third wakeword, causing further processing to be performed on the second audio data using the second assistant voice component.

11. The computer-implemented method of claim 5, wherein: the first encoder comprises a convolutional neural network including the first neural network layers;
the audio data represents a plurality of audio frames;
the method comprises:
   determining a first portion of the audio data corresponding to a first subset of the plurality of audio frames,
   processing, by the first encoder, the first portion to determine a first feature vector representing at least one acoustic unit represented by the first subset,
   determining a second portion of the audio data corresponding to a second subset of the plurality of audio frames, and
   processing, by the first encoder, the second portion to determine a second feature vector representing at least one acoustic unit represented by the second subset; and
the first encoded audio data includes the first feature vector and the second feature vector.

12. The computer-implemented method of claim 5, wherein:
the first decoder corresponds to a first assistant voice component; and
the second decoder corresponds to a second assistant voice component different from the first assistant voice component.

13. The computer-implemented method of claim 5, wherein the first encoder, the first decoder, and the second decoder are included in a first wakeword component.

14. The computer-implemented method of claim 5, wherein:
the first decoder comprises a second machine learning model including second neural network layers configured to detect the second wakeword based on encoded audio data received from the first encoder; and
the second decoder comprises a third machine learning model including third neural network layers configured to detect the second wakeword based on encoded audio data received from the first encoder.

15. A system, comprising:
at least one processor; and
at least one memory comprising instructions that, when executed by the at least one processor, cause the system to:
receive a request to enable a first wakeword with respect to a first device;
determine the first device is configured to operate with respect to a second wakeword;
determine first wakeword component data including:
first data corresponding to a first encoder configured to process input audio data and determine encoded audio data, wherein the first encoder comprises a first machine learning model including neural network layers configured to process audio data into encoded audio data, and wherein the first machine learning model is trained using training audio data representing audio samples, the audio samples including first audio samples corresponding to the first wakeword and second audio samples corresponding to the second wakeword, the first encoder being trained to output data for at least a first decoder and a second decoder,
second data corresponding to the first decoder configured to process encoded audio data to determine when input audio data included a representation of the first wakeword, and
third data corresponding to the second decoder configured to process encoded audio data to determine when input audio data included a representation of the second wakeword; and
send the first wakeword component data to the first device.

16. The system of claim 15, wherein the at least one memory further comprises instructions that, when executed by the at least one processor, further cause the system to, prior to receiving the request:
determine second wakeword component data including:
   the first data corresponding to the first encoder, and
   the third data corresponding to the second decoder; and
send the first wakeword component data to the first device.

17. The system of claim 15, wherein the at least one memory further comprises instructions that, when executed by the at least one processor, further cause the system to:
receive a second request to enable a third wakeword with respect to the first device; and
send, to the first device, fourth data corresponding to a third decoder configured to process encoded audio data to determine when input audio data included a representation of the third wakeword.

18. The system of claim 15, wherein the at least one memory further comprises instructions that, when executed by the at least one processor, further cause the system to:
receive a request to enable the first wakeword with respect to a second device;
determine the second device is configured to operate with respect to a third wakeword;
determine second wakeword component data including:
   the first data corresponding to the first encoder,
   the second data corresponding to the first decoder, and
   fourth data corresponding to a third decoder configured to process encoded audio data to determine when input audio data included a representation of the third wakeword; and
send the second wakeword component data to the first device.

19. The system of claim 15, wherein the instructions that cause the system to determine the first device is configured to operate with respect to a second wakeword comprise instructions that, when executed by the at least one processor, cause the system to:
determine a first profile associated with the first device; and
use the first profile to determine the first device is configured to operate with respect to the second wakeword.

20. The system of claim 15, wherein the at least one memory further comprises instructions that, when executed by the at least one processor, further cause the system to:

determine a first profile associated with the first device; and send the first wakeword component data to a second device associated with the first profile.

21. The system of claim 15, wherein:

the first decoder corresponds to a first assistant voice service; and the second decoder corresponds to a second assistant voice service different from the first assistant voice service.

22. The system of claim 15, wherein:

determination of the first wakeword component data is performed prior to receipt of the request; and the at least one memory further comprises instructions that, when executed by the at least one processor, further cause the system to:

prior to receipt of the request, store the first wakeword component data; and after receipt of the request:

determine a first group of wakewords to be enabled with respect to the first device, the first group including at least the first wakeword and the second wakeword, determine the first group corresponds to first wakeword component data, and in response to the first group corresponding to the first wakeword component data, send the first wakeword component data to the first device.

\* \* \* \* \*